(12) United States Patent
Zhang

(10) Patent No.: US 11,112,585 B2
(45) Date of Patent: Sep. 7, 2021

(54) OPTICAL IMAGING LENS ASSEMBLY

(71) Applicant: Zhejiang Sunny Optical Co., Ltd, Ningbo (CN)

(72) Inventor: Kaiyuan Zhang, Ningbo (CN)

(73) Assignee: ZHEJIANG SUNNY OPTICAL CO., LTD, Ningbo (CN)

( * ) Notice: Subject to any disclaimer, the term of this patent is extended or adjusted under 35 U.S.C. 154(b) by 185 days.

(21) Appl. No.: 16/229,231

(22) Filed: Dec. 21, 2018

(65) Prior Publication Data

US 2019/0113719 A1  Apr. 18, 2019

Related U.S. Application Data

(63) Continuation of application No. PCT/CN2018/080124, filed on Mar. 23, 2018.

(30) Foreign Application Priority Data

Sep. 7, 2017 (CN) .......................... 201710801831.2
Sep. 7, 2017 (CN) .......................... 201721142627.6

(51) Int. Cl.
*G02B 13/00* (2006.01)
*G02B 13/18* (2006.01)
(Continued)

(52) U.S. Cl.
CPC ......... *G02B 13/0045* (2013.01); *G02B 7/021* (2013.01); *G02B 9/62* (2013.01);
(Continued)

(58) Field of Classification Search
CPC .... G02B 9/62; G02B 13/00; G02B 13/13005; G02B 13/0045; G02B 13/04; G02B 13/18;
(Continued)

(56) References Cited

U.S. PATENT DOCUMENTS

2013/0033762 A1* 2/2013 Tsai .................... G02B 13/0045
   359/713
2015/0338607 A1* 11/2015 Liao .......................... G02B 9/62
   359/713
(Continued)

FOREIGN PATENT DOCUMENTS

CN    104570284    4/2015
CN    105487201    4/2016
(Continued)

*Primary Examiner* — Jie Lei
(74) *Attorney, Agent, or Firm* — Hauptman Ham, LLP

(57) ABSTRACT

The present disclosure discloses an optical imaging lens assembly. The optical imaging lens assembly includes, sequentially from an object side to an image side along an optical axis, a first lens, a second lens, a third lens, a fourth lens, a fifth lens, and a sixth lens. The first lens has a positive refractive power and a convex object-side surface. The second lens has a refractive power, a convex object-side surface, and a concave image-side surface. Each of the third lens and the fourth lens has a refractive power. The fifth lens has a positive refractive power, and a convex image-side surface. The sixth lens has a negative refractive power, and a concave object-side surface and a concave image-side surface. A total effective focal length f of the optical imaging lens assembly and an entrance pupil diameter EPD of the optical imaging lens assembly satisfy: f/EPD≤1.6.

19 Claims, 11 Drawing Sheets

(51) Int. Cl.
G02B 27/00 (2006.01)
G02B 7/02 (2021.01)
G02B 9/62 (2006.01)

(52) U.S. Cl.
CPC ............. *G02B 13/00* (2013.01); *G02B 13/18* (2013.01); *G02B 27/0025* (2013.01)

(58) Field of Classification Search
CPC ...... G02B 27/00; G02B 27/0025; G02B 7/02; G02B 7/021; G02B 7/04; G02B 3/04
USPC .................. 359/713, 739, 756–760, 682, 752
See application file for complete search history.

(56) References Cited

U.S. PATENT DOCUMENTS

| 2015/0370038 A1* | 12/2015 | Sun ...................... G02B 13/005 359/757 |
| 2016/0018629 A1 | 1/2016 | Tang et al. |
| 2016/0091694 A1 | 3/2016 | Tang et al. |
| 2017/0045717 A1 | 2/2017 | Park |
| 2017/0090156 A1* | 3/2017 | Hsu .................... G02B 13/0045 |

FOREIGN PATENT DOCUMENTS

| CN | 106556919 | 4/2017 |
| CN | 107436477 | 12/2017 |

* cited by examiner

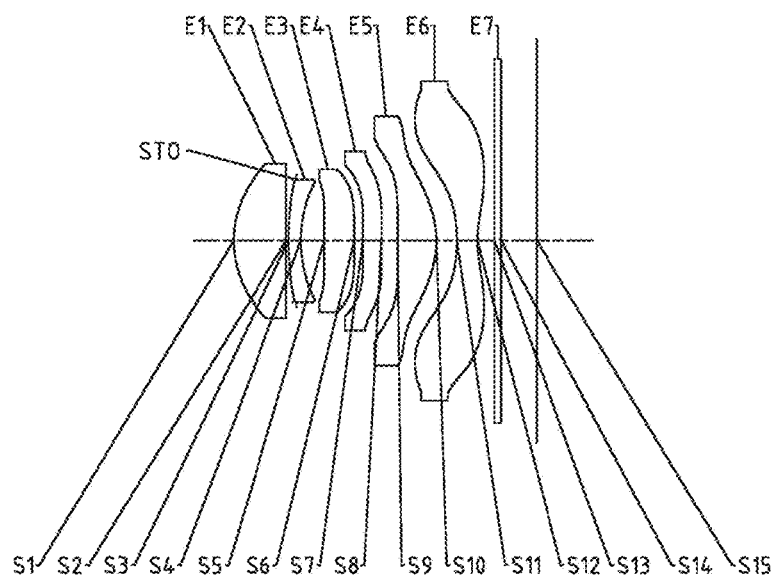
Fig. 1
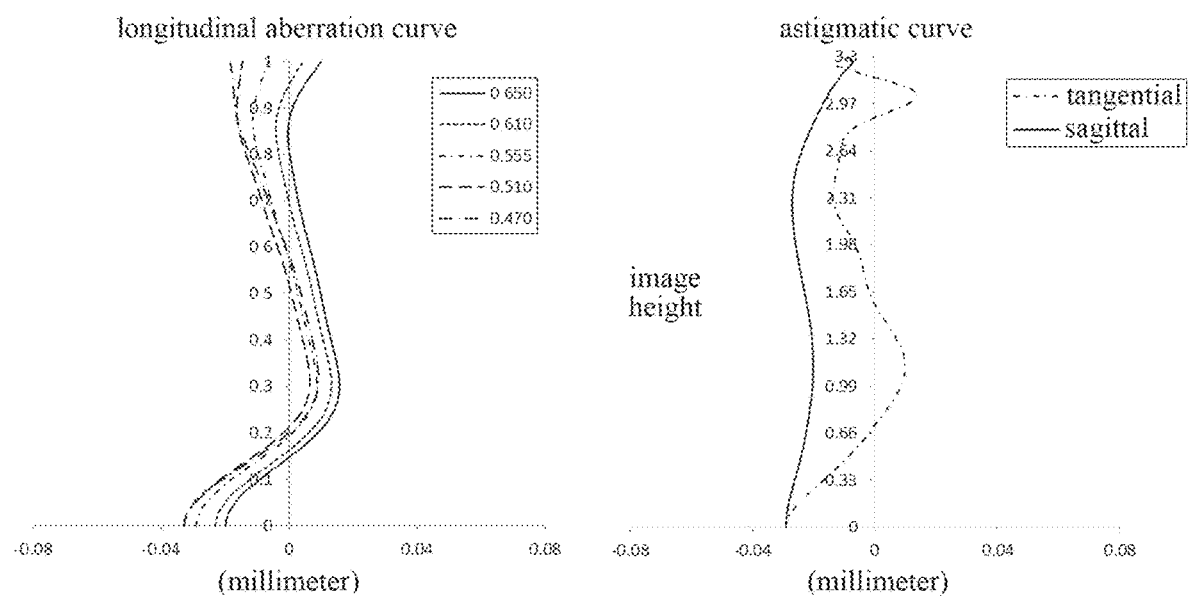
Fig. 2A
Fig. 2B

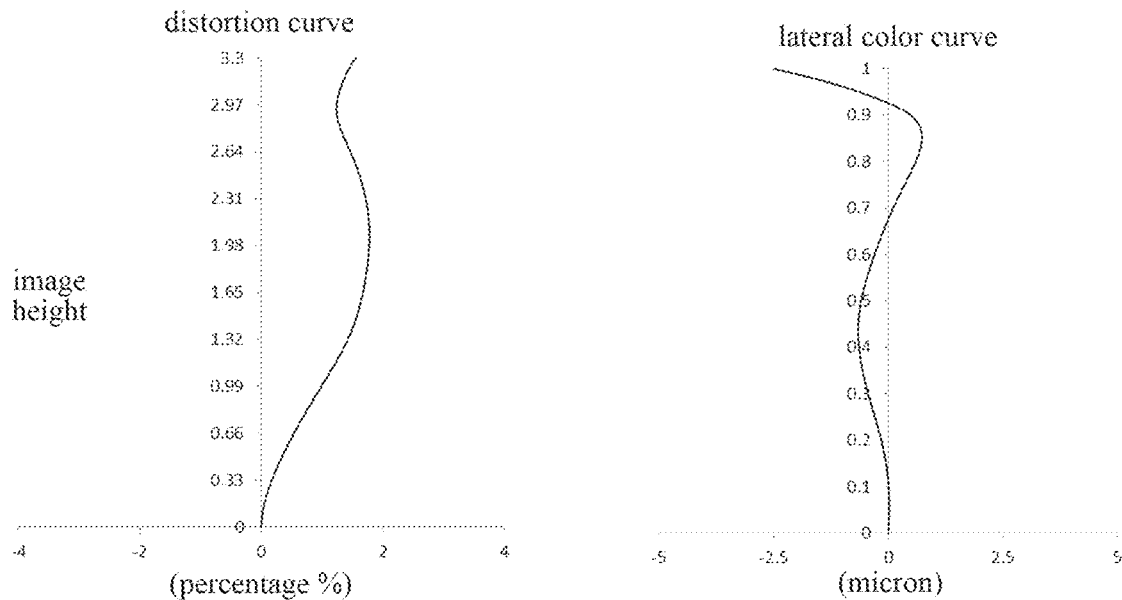
Fig. 2C
Fig. 2D
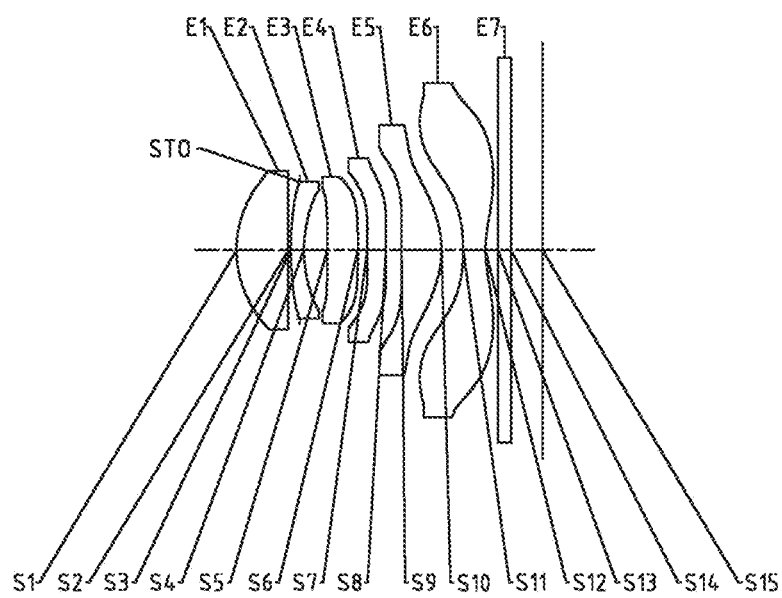
Fig. 3

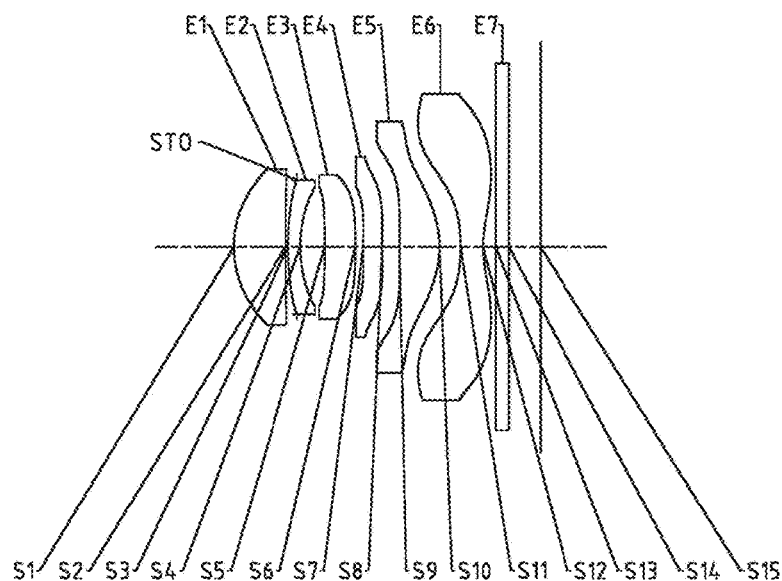
Fig. 5
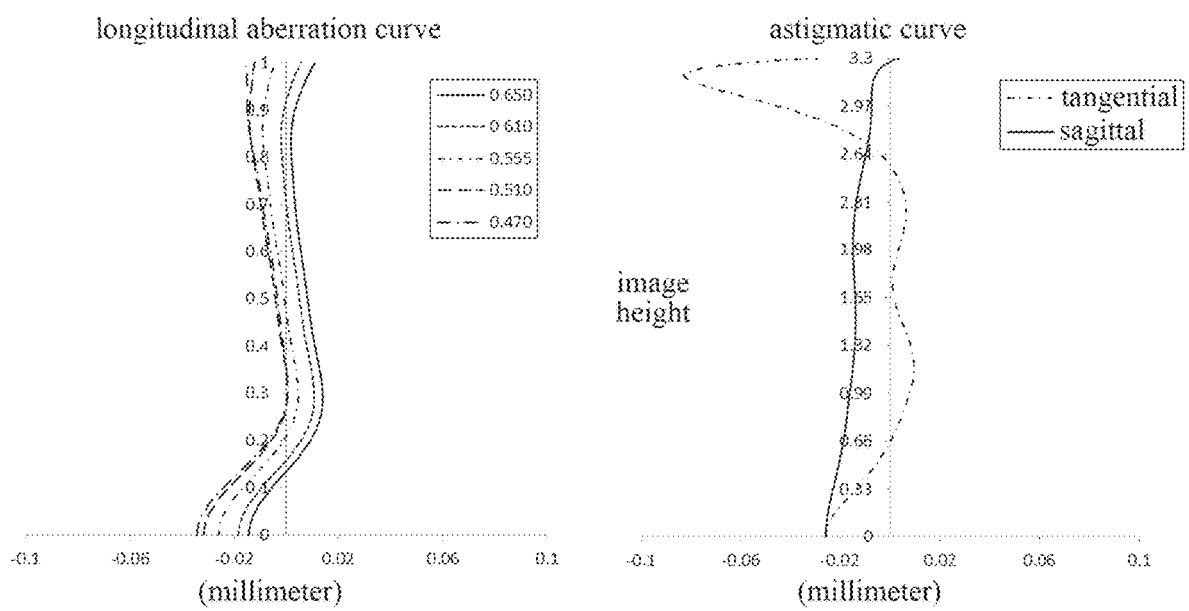
Fig. 6A                    Fig. 6B

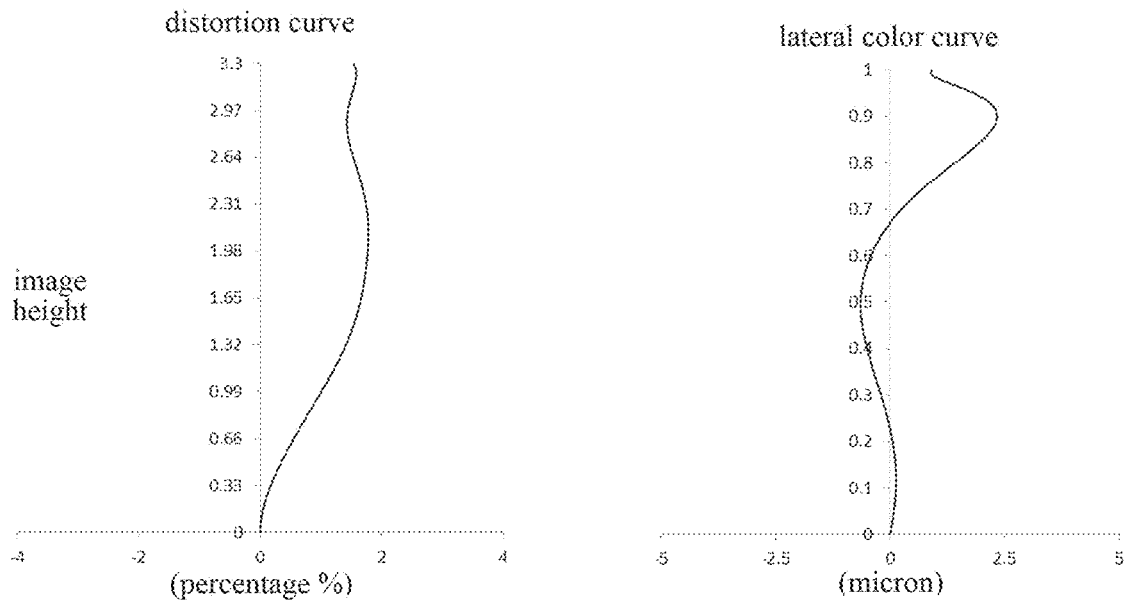
Fig. 6C
Fig. 6D
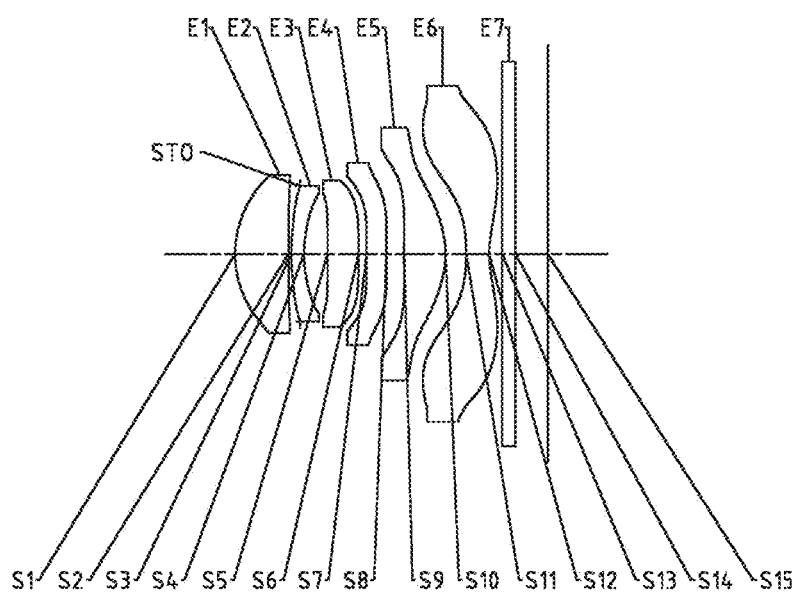
Fig. 7

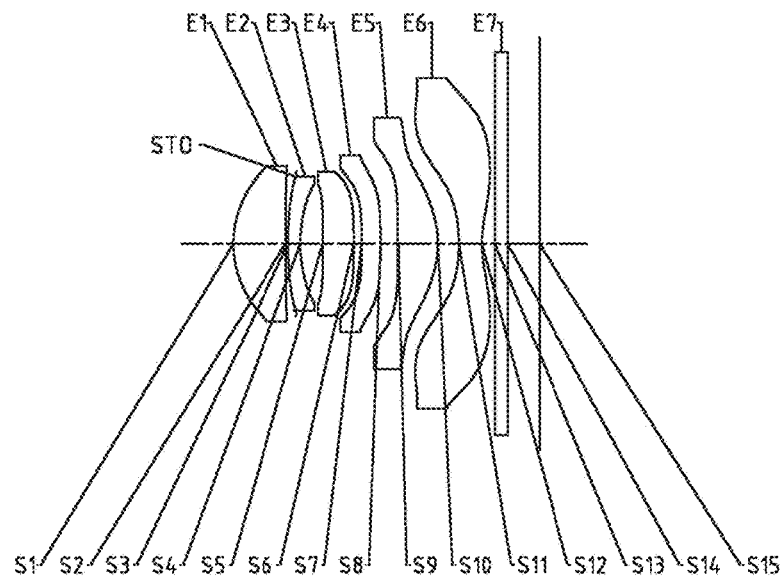
Fig. 9
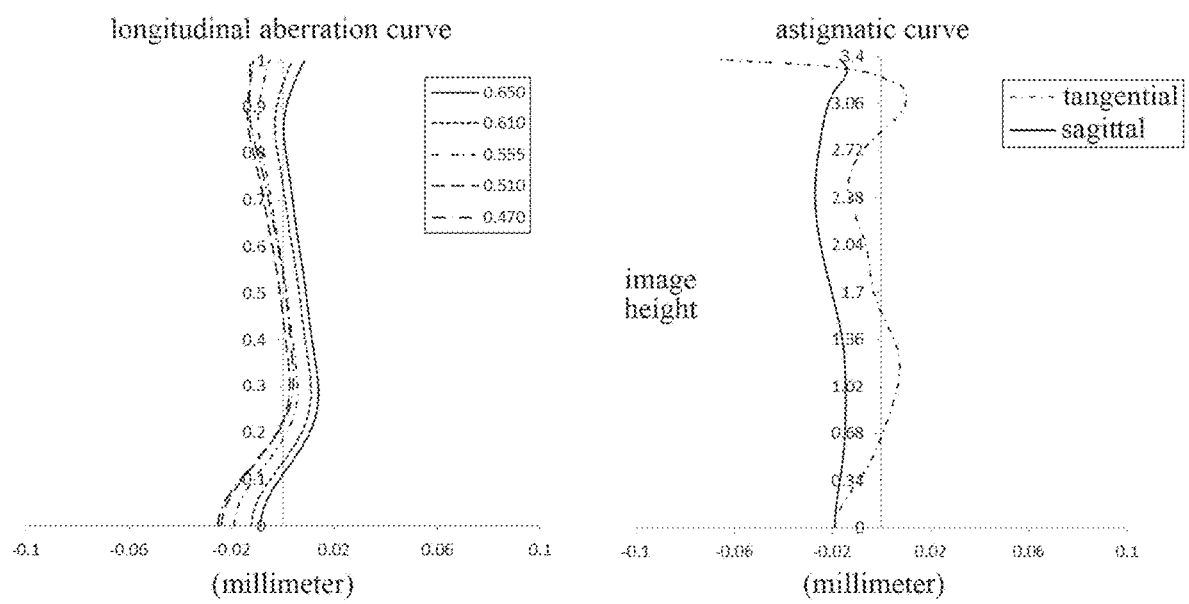
Fig. 10A
Fig. 10B

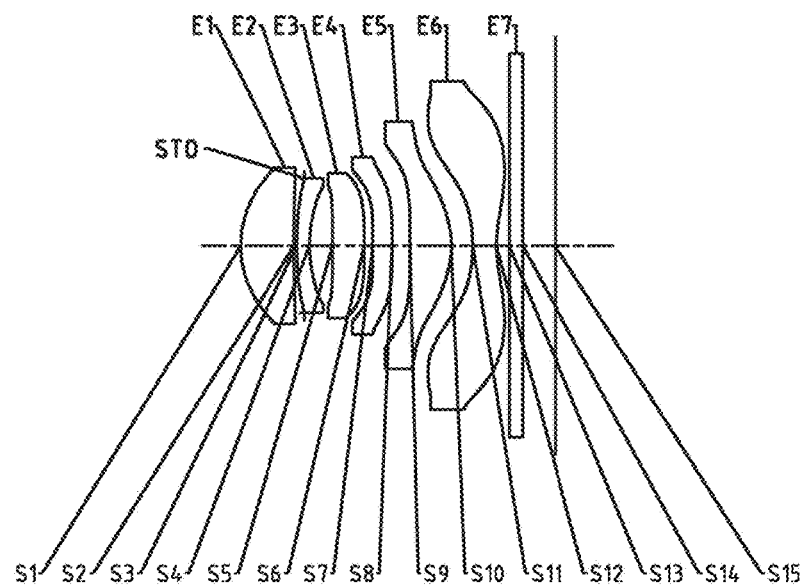
Fig. 13
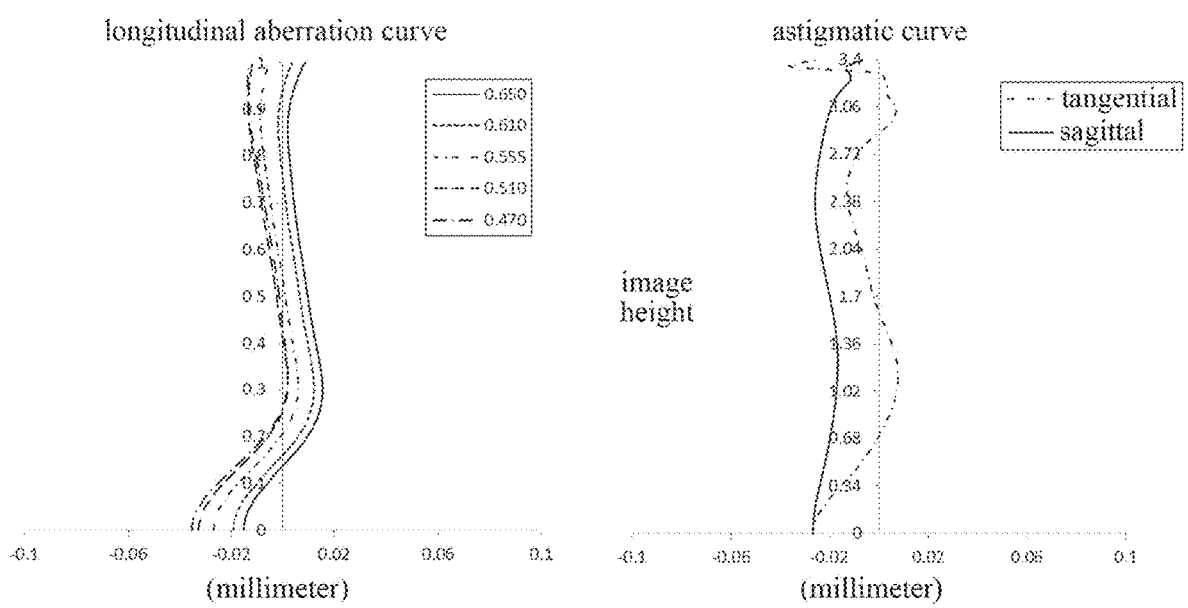
Fig. 14A                    Fig. 14B

OPTICAL IMAGING LENS ASSEMBLY

CROSS-REFERENCE TO RELATED APPLICATIONS

This is a continuation of International Application PCT/CN2018/080124, with an international filing date of Mar. 23, 2018, which claims the priorities and rights to Chinese Patent Application No. 201710801831.2 and Chinese Patent Application No. 201721142627.6 filed with the China National Intellectual Property Administration (CNIPA) on Sep. 7, 2017, the disclosures of which are hereby incorporated by reference in their entireties.

TECHNICAL FIELD

The present disclosure relates to an optical imaging lens assembly, and more specifically to an optical imaging lens assembly including six lenses.

BACKGROUND

With the popularity of electronic products such as cell phones and tablet computers, and the fulfillment of portable requirements of consumers on the electronic products in daily life, there is an increasing demand for the lightening and thinning trend of the electronic products. The tendency of miniaturization of the portable electronic products limits the total length of the counterpart lens assemblies, thereby increasing the difficulty in designing the lens assemblies.

Meanwhile, with the improvement in performance and reduction in size of the commonly used photosensitive elements such as charge-coupled devices (CCD) or complementary metal-oxide semiconductor elements (CMOS), the number of pixels is increased and the size of the pixels is reduced. Accordingly, higher requirements on high imaging quality and miniaturization of the counterpart optical imaging lens assemblies have been brought forward.

The reduction of the size of the pixels implies that the light flux of a lens assembly would be reduced in the same explosure time. However, in the conditions of dark environments (e.g., cloudy and rainy days, or at dusk), the lens assembly needs to have a large light flux, to ensure the imaging quality.

SUMMARY

The present disclosure provides an optical imaging lens assembly having a large aperture which may be applicable to portable electronic products and may at least or partially solve at least one of the above disadvantages in the existing technology.

According to an aspect, the present disclosure provides an optical imaging lens assembly. The optical imaging lens assembly includes, sequentially from an object side to an image side, a first lens along an optical axis, a second lens, a third lens, a fourth lens, a fifth lens, and a sixth lens. The first lens may have a positive refractive power, and an object-side surface of the first lens may be a convex surface. The second lens may have a refractive power, an object-side surface of the second lens may be a convex surface, and an image-side surface of the second lens may be a concave surface. Each of the third lens and the fourth lens may have a refractive power. The fifth lens may have a positive refractive power, and an image-side surface of the fifth lens may be a convex surface. The sixth lens may have a negative refractive power, and an object-side surface and an image-side surface of the sixth lens may both be concave surfaces. A total effective focal length f of the optical imaging lens assembly and an entrance pupil diameter EPD of the optical imaging lens assembly may satisfy: $f/EPD \leq 1.6$.

In an embodiment, an axial distance TTL from the object-side surface of the first lens to an image plane of the optical imaging lens assembly and half of a diagonal length ImgH of an effective pixel area on the image plane of the optical imaging lens assembly may satisfy: $TTL/ImgH \leq 1.5$.

In an embodiment, an effective focal length f1 of the first lens and a center thickness CT1 of the first lens on the optical axis may satisfy: $3 < f1/CT1 < 4$.

In an embodiment, a center thickness CT2 of the second lens on the optical axis and a spacing distance T12 between the first lens and the second lens on the optical axis may satisfy: $4 < CT2/T12 < 6$.

In an embodiment, a radius of curvature R3 of the object-side surface of the second lens and a radius of curvature R4 of the image-side surface of the second lens satisfy: $1.5 < R3/R4 < 2.5$.

In an embodiment, the second lens may have a negative refractive power, and an effective focal length f2 of the second lens and the total effective focal length f of the optical imaging lens assembly satisfy: $-2 < f2/f < -1$.

In an embodiment, a radius of curvature R7 of an object-side surface of the fourth lens and a radius of curvature R8 of an image-side surface of the fourth lens may satisfy: $-1 < (R7-R8)/(R7+R8) < 2$.

In an embodiment, the total effective focal length f of the optical imaging lens assembly and a radius of curvature R10 of the image-side surface of the fifth lens may satisfy: $-3 < f/R10 < -2.5$.

In an embodiment, an effective focal length f5 of the fifth lens and the total effective focal length f of the optical imaging lens assembly may satisfy: $0.5 < f5/f < 1$.

In an embodiment, a radius of curvature R11 of the object-side surface of the sixth lens and a radius of curvature R12 of the image-side surface of the sixth lens may satisfy: $-2 < R11/R12 < -1.5$.

In an embodiment, a sum ΣCT of center thicknesses of the first lens, the second lens, the third lens, the fourth lens, the fifth lens, and the sixth lens on the optical axis, and the axial distance TTL from the object-side surface of the first lens to the image plane of the optical imaging lens assembly may satisfy: $0.5 < \Sigma CT/TTL < 0.7$.

According to another aspect, the present disclosure provides an optical imaging lens assembly. The optical imaging lens assembly includes, sequentially from an object side to an image side along an optical axis, a first lens, a second lens, a third lens, a fourth lens, a fifth lens, and a sixth lens. Each of the first lens and the fifth lens may have a positive refractive power. Each of the second lens and the sixth lens may have a negative refractive power. At least one of the third lens or the fourth lens may have a positive refractive power. At least one of an object-side surface of the first lens or an image-side surface of the first lens may be a convex surface. An object-side surface and an image-side surface of the sixth lens may both be concave surfaces. An image-side surface of the fifth lens may be a convex surface. A radius of curvature R10 of the image-side surface of the fifth lens and a total effective focal length f of the optical imaging lens assembly MAY satisfy: $-3 < f/R10 < -2.5$.

In an embodiment, the object-side surface of the first lens may be a convex surface.

In an embodiment, an object-side surface of the second lens may be a convex surface, and an image-side surface of the second lens may be a concave surface.

The present disclose adopts a plurality of lenses, for example, six lenses. By reasonably distributing the refractive powers and the surface types of the lenses, the center thicknesses of the lenses, and the spacing distances between the lenses on the optical axis, etc., an optical imaging lens assembly is provided, which has at least one of the beneficial effects such as high resolution, large aperture, ultra-thin, miniaturization, and easy processing.

BRIEF DESCRIPTION OF THE DRAWINGS

By describing non-limiting embodiments below in detail and in combination with the accompanying drawings, other features, objectives and advantages of the present disclosure will be more apparent. In the accompanying drawings:

FIG. 1 is a schematic structural diagram illustrating an optical imaging lens assembly according to Embodiment 1 of the present disclosure;

FIGS. 2A-2D respectively illustrate a longitudinal aberration curve, an astigmatic curve, a distortion curve, and a lateral color curve of the optical imaging lens assembly according to Embodiment 1;

FIG. 3 is a schematic structural diagram illustrating an optical imaging lens assembly according to Embodiment 2 of the present disclosure;

FIG. 5 is a schematic structural diagram illustrating an optical imaging lens assembly according to Embodiment 3 of the present disclosure;

FIGS. 6A-6D respectively illustrate a longitudinal aberration curve, an astigmatic curve, a distortion curve, and a lateral color curve of the optical imaging lens assembly according to Embodiment 3;

FIG. 7 is a schematic structural diagram illustrating an optical imaging lens assembly according to Embodiment 4 of the present disclosure;

FIG. 9 is a schematic structural diagram illustrating an optical imaging lens assembly according to Embodiment 5 of the present disclosure;

FIGS. 10A-10D respectively illustrate a longitudinal aberration curve, an astigmatic curve, a distortion curve, and a lateral color curve of the optical imaging lens assembly according to Embodiment 5;

FIG. 13 is a schematic structural diagram illustrating an optical imaging lens assembly according to Embodiment 7 of the present disclosure; and FIGS. 14A-14D respectively illustrate a longitudinal aberration curve, an astigmatic curve, a distortion curve, and a lateral color curve of the optical imaging lens assembly according to Embodiment 7.

DETAILED DESCRIPTION

Figure 4A:
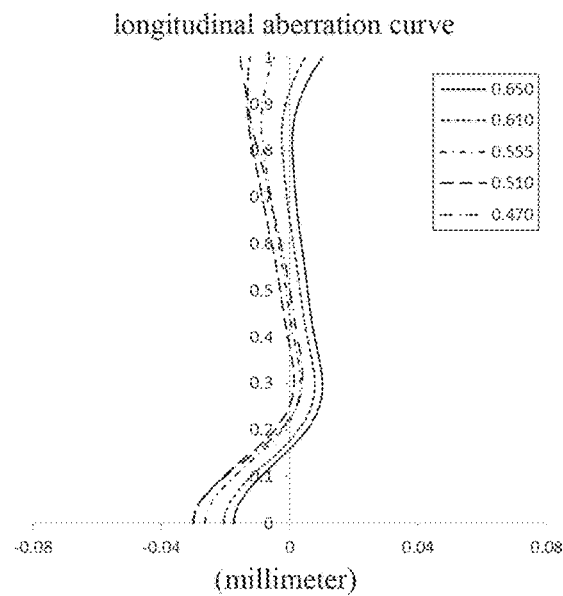
FIGS. 4A-4D respectively illustrate a longitudinal aberration curve, an astigmatic curve, a distortion curve, and a lateral color curve of the optical imaging lens assembly according to Embodiment 2.

For a better understanding of the present disclosure, various aspects of the present disclosure will be described in more detail with reference to the accompanying drawings. It should be understood that the detailed description is merely an illustration for the exemplary embodiments of the present disclosure rather than a limitation to the scope of the present disclosure in any way. Throughout the specification, the same reference numerals designate the same elements. The expression "and/or" includes any and all combinations of one or more of the associated listed items.

It should be noted that in the specification, the expressions, such as "first," "second," and "third" are only used to distinguish one feature from another, rather than represent any limitations to the features. Thus, the first lens discussed below may also be referred to as the second lens or the third lens without departing from the teachings of the present disclosure.

In the accompanying drawings, the thicknesses, sizes and shapes of the lenses have been slightly exaggerated for the convenience of explanation. Specifically, shapes of spherical surfaces or aspheric surfaces shown in the accompanying drawings are shown by examples. That is, the shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If a surface of a lens is a convex surface and a position of the convex surface is not defined, it indicates that the surface of the lens is a convex surface at least in the paraxial area. If a surface of a lens is a concave surface and a position of the concave surface is not defined, it indicates that the surface of the lens is a concave surface at least in the paraxial area. The surface closest to the object in each lens is referred to as the object-side surface, and the surface closest to the image plane in each lens is referred to as the image-side surface.

It should be further understood that the terms "comprising," "including," "having" and variants thereof, when used in the specification, specify the presence of stated features, elements and/or components, but do not exclude the presence or addition of one or more other features, elements, components and/or combinations thereof. In addition, expressions, such as "at least one of," when preceding a list of listed features, modify the entire list of features rather than an individual element in the list. Further, the use of "may," when describing the embodiments of the present disclosure, relates to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It should be further understood that terms (i.e., those defined in commonly used dictionaries) should be interpreted as having a meaning that is consistent with their meaning in the context of the relevant art and will not be interpreted in an idealized or overly formal sense unless expressly so defined herein.

It should also be noted that the embodiments in the present disclosure and the features in the embodiments may be combined with each other on a non-conflict basis. The present disclosure will be described below in detail with reference to the accompanying drawings and in combination with the embodiments.

Features, principles, and other aspects of the present disclosure are described below in detail.

The optical imaging lens assembly according to exemplary embodiments of the present disclosure includes, for example, six lenses (i.e., a first lens, a second lens, a third lens, a fourth lens, a fifth lens, and a sixth lens) having refractive powers. The six lenses are arranged in sequence from an object side to an image side along an optical axis. The optical imaging lens assembly may further include a photosensitive element disposed on an image plane.

The first lens may have a positive refractive power. At least one of the object-side surface of the first lens or the image-side surface of the first lens may be a convex surface. An effective focal length f1 of the first lens and a center thickness CT1 of the first lens on the optical axis may satisfy: $3<f1/CT1<4$, and more specifically, f1 and CT1 may further satisfy: $3.65 \leq f1/CT1 \leq 3.90$. By controlling the ratio of the effective focal length of the first lens to the center thickness of the first lens on the optical axis within a reasonable range, the processibility of the first lens can be ensured. At the same time, the contribution rate of the spherical aberration of the first lens can be effectively controlled within a reasonable range, so that the system has a good imaging quality in the on-axis field-of-view and the range near the field-of-view.

Alternatively, the object-side surface of the first lens may be a convex surface, and the image-side surface of the first lens may be a convex surface or a concave surface.

The second lens may have a positive refractive power or a negative refractive power. Alternatively, the second lens has a negative refractive power. An effective focal length f2 of the second lens and a total effective focal length f of the optical imaging lens assembly may satisfy: $-2<f2/f<-1$, and more specifically, f2 and f may further satisfy: $-1.69 \leq f2/f \leq -1.44$. By reasonably controlling the size and direction of the refractive power of the second lens, the contribution of the spherical aberration of the second lens and the direction of the spherical aberration can be used to offset and balance most of the third-order spherical aberrations generated by the first lens. Accordingly, the imaging quality of the lens assembly can be effectively improved.

The object-side surface of the second lens may be a convex surface, and the image-side surface of the second lens may be a concave surface. A radius of curvature R3 of the object-side surface of the second lens and a radius of curvature R4 of the image-side surface of the second lens may satisfy: $1.5 \leq R3/R4 \leq 2.5$, and more specifically, R3 and R4 may further satisfy: $1.91 \leq R3/R4 \leq 2.15$. By controlling the radii of curvature of the object-side surface and the image-side surface of the second lens, the total deflection angle of the edge field-of-view between the two surfaces can be controlled within a reasonable range, thereby effectively reducing the sensitivity of the system.

A center thickness CT2 of the second lens on the optical axis and a spacing distance T12 between the first lens and the second lens on the optical axis may satisfy: $4<CT2/T12<6$, and more specifically, CT2 and T12 may further satisfy: $4.30 \leq CT2/T12 \leq 5.69$. By restricting the range of the ratio of the center thickness CT2 of the second lens on the optical axis to the spacing distance T12 between the first lens and the second lens on the optical axis, the distortion contribution of the first lens is controlled, to compensate the amount of distortion generated by the subsequent lenses.

The third lens has a positive refractive power or a negative refractive power. Alternatively, the third lens may have a positive refractive power.

The fourth lens has a positive refractive power or a negative refractive power. A radius of curvature R7 of the object-side surface of the fourth lens and a radius of curvature R8 of the image-side surface of the fourth lens may satisfy: $-1<(R7-R8)/(R7+R8)<2$, and more specifically, R7 and R8 may further satisfy: $-0.55 (R7-R8)/(R7+R8) \leq 1.81$. By controlling the ratio between the radii of curvature of the object-side surface and the image-side surface of the fourth lens, the contribution of the astigmatism of the object-side surface of the fourth lens and the contribution of the astigmatism of the image-side surface of the fourth lens can be effectively controlled, and then the imaging qualities of the intermediate field-of-view and the aperture band are reasonably and effectively controlled.

The fifth lens may have a positive refractive power. An effective focal length f5 of the fifth lens and the total effective focal length f of the optical imaging lens assembly may satisfy: $0.5<f5/f<1$, and more specifically, f5 and f may further satisfy: $0.64 \leq f5/f \leq 0.66$. By controlling the range of the effective focal length of the fifth lens, the contribution of the refractive power of the fifth lens can be reasonably controlled, and the contribution of the negative spherical aberration of the fifth lens can be reasonably controlled at the same time, so that the negative spherical aberration generated by the fifth lens can effectively balance the positive spherical aberration generated by each negative component (i.e., each lens having a negative refractive power in the lens assembly).

The image-side surface of the fifth lens may be a convex surface. The total effective focal length f of the optical imaging lens assembly and a radius of curvature R10 of the image-side surface S10 of the fifth lens may satisfy: $-3<f/R10<-2.5$, and more specifically, f and R10 may further satisfy: $-2.81 \leq f/R10 \leq -2.67$. By controlling the radius of curvature of the image-side surface of the fifth lens, the contribution of the fifth-order spherical aberration of the fifth lens can be well controlled, to compensate and balance the third-order spherical aberration generated by the above lens component (i.e., each lens between the object side and the fifth lens), so that the lens assembly has a good imaging quality in the on-axis field-of-view area.

The sixth lens may have a negative refractive power, the object-side surface of the sixth lens may be a concave surface, and the image-side surface of the sixth lens may be a concave surface. A radius of curvature R11 of the object-side surface of the sixth lens and a radius of curvature R12 of the image-side surface of the sixth lens may satisfy: $-2<R11/R12<-1.5$, and more specifically, R11 and R12 may further satisfy: $-1.85 \leq R11/R12 \leq -1.73$. By controlling the range of the ratio of the radius of curvature of the object-side surface of the sixth lens to the radius of curvature of the image-side surface of the sixth lens, the trend of the ratio between the thicknesses of the aspheric surfaces of the sixth lens can be reasonably controlled, so that the sixth lens falls within the range in which the sixth lens is easily processed, thereby improving the processability of the lens assembly.

The sum $\Sigma CT$ of the center thicknesses of the respective lenses on the optical axis and the total track length TTL of the optical imaging lens assembly (i.e., the axial distance from the center of the object-side surface of the first lens to the image plane of the lens assembly) may satisfy: $0.5<\Sigma CT/TTL<0.7$, and more specifically, $0.57 \leq \Sigma CT/TTL \leq 0.58$. By controlling the range of the total center thickness of the lenses having a refractive power, the remaining distortion after being balanced by the each lens can be controlled within a reasonable range, so that the optical imaging system has a good distortion elimination performance.

The total track length TTL of the optical imaging lens assembly and half of a diagonal length ImgH of an effective pixel area on the image plane of the optical imaging lens assembly may satisfy: TTL/ImgH≤1.5, and more specifically, TTL and ImgH may further satisfy: 1.46≤TTL/ImgH≤1.49. By controlling the ratio of the total track length of the lens assembly to the image height, the overall size of the imaging lens assembly may be effectively compressed, to achieve ultra-thin characteristics and miniaturization of the optical imaging lens assembly. Accordingly, the optical imaging lens assembly can be better applicable to a size-limited system such as a portable electronic product.

The total effective focal length f of the optical imaging lens assembly and an entrance pupil diameter EPD of the optical imaging lens assembly may satisfy: f/EPD≤1.6, and more specifically, f and EPD may further satisfy: 1.57≤f/EPD≤1.59. The smaller the f-number Fno of the optical imaging lens assembly (i.e., the total effective focal length f of the lens assembly/the entrance pupil diameter EPD of the lens assembly) is, and the larger the clear aperture of the lens assembly is, the larger the amount of light entering in the same unit time is. The reduction of the f-number Fno may effectively enhance the brightness of the image plane, so that the lens assembly can better satisfy the shooting needs when the light is insufficient. The lens assembly is configured to satisfy the conditional expression f/EPD≤1.6, such that the lens assembly may have advantages of the large aperture in the process of increasing the light flux, thereby enhancing the imaging effect of the optical imaging lens assembly in the dark environment.

In the exemplary embodiments, the optical imaging lens assembly may also be provided with a diaphragm for limiting ligh beams, to further improve the imaging quality of the lens assembly. Alternatively, the diaphragm may be disposed between the first lens and the second lens. However, it should be understood by those skilled in the art that the diaphragm may be disposed at any position between the object side and the image side as needed, that is, the arrangement of the diaphragm should not be limited to the position between the first lens and the second lens.

Alternatively, the optical imaging lens assembly may further include an optical filter for correcting color deviations and/or a protective glass for protecting the photosensitive element on the image plane.

The optical imaging lens assembly according to the above embodiments of the present disclosure may use a plurality of lenses, for example, the six lenses described above. By reasonably distributing the refractive powers and the surface types of the lenses, the center thicknesses of the lenses, and the spacing distances between the lenses on the axis, etc., an ultra-thin imaging lens assembly having a large aperture and a f-number Fno of about 1.5 is provided, which may be applicable to the portable electronic product. The imaging system not only has the characteristics of high resolution, ultra-thin, and easy processing, but also has a large aperture advantage, which may enhance the imaging effect in a dark environment. In addition, it is also possible to ensure that the optical imaging lens assembly better matches a CCD chip with a large image plane.

In the embodiments of the present disclosure, at least one of the surfaces of the lenses is an aspheric surface. The aspheric lens is characterized in that the curvature continuously changes from the center of the lens to the periphery. Different from a spherical lens having a constant curvature from the center of the lens to the periphery, the aspheric lens has a better radius-of-curvature characteristic, and has advantages of improving the distortion aberration and the astigmatic aberration. The use of the aspheric lens can eliminate as much as possible the aberrations that occur during the imaging, thereby improving the imaging quality.

However, it should be understood by those skilled in the art that the various results and advantages described in the present specification may be obtained by changing the number of the lenses constituting the optical imaging lens assembly without departing from the technical solution claimed by the present disclosure. For example, although the optical imaging lens assembly having six lenses is described as an example in the embodiments, the optical imaging lens assembly is not limited to include six lenses. If desired, the optical imaging lens assembly may also include other numbers of lenses.

Specific embodiments of the optical imaging lens assembly that may be applied to the above embodiments are further described below with reference to the accompanying drawings.

Embodiment 1

An optical imaging lens assembly according to Embodiment 1 of the present disclosure is described below with reference to FIGS. 1-2D. FIG. 1 is a schematic structural diagram illustrating the optical imaging lens assembly according to Embodiment 1 of the present disclosure.

As shown in FIG. 1, the optical imaging lens assembly includes, sequentially from an object side to an image side along an optical axis, a first lens E1, a second lens E2, a third lens E3, a fourth lens E4, a fifth lens E5, a sixth lens E6, and an image plane S15.

The first lens E1 has a positive refractive power, an object-side surface S1 of the first lens E1 is a convex surface, and an image-side surface S2 of the first lens E1 is a convex surface. The object-side surface S1 and the image-side surface S2 of the first lens E1 are both aspheric surfaces.

The second lens E2 has a negative refractive power, an object-side surface S3 of the second lens E2 is a convex surface, and an image-side surface S4 of the second lens E2 is a concave surface. The object-side surface S3 and the image-side surface S4 of the second lens E2 are both aspheric surfaces.

The third lens E3 has a positive refractive power, an object-side surface S5 of the third lens E3 is a convex surface, and an image-side surface S6 of the third lens E3 is a concave surface. The object-side surface S5 and the image-side surface S6 of the third lens E3 are both aspheric surfaces.

The fourth lens E4 has a negative refractive power, an object-side surface S7 of the fourth lens E4 is a convex surface, and an image-side surface S8 of the fourth lens E4 is a concave surface. The object-side surface S7 and the image-side surface S8 of the fourth lens E4 are both aspheric surfaces.

The fifth lens E5 has a positive refractive power, an object-side surface S9 of the fifth lens E5 is a convex surface, and an image-side surface 310 of the fifth lens E5 is a convex surface. The object-side surface S9 and the image-side surface S10 of the fifth lens E5 are both aspheric surfaces.

The sixth lens E6 has a negative refractive power, an object-side surface S11 of the sixth lens E6 is a concave surface, and an image-side surface S12 of the sixth lens E6 is a concave surface. The object-side surface S11 and the image-side surface S12 of the sixth lens E6 are both aspheric surfaces.

Alternatively, the optical imaging lens assembly may further include an optical filter E7 having an object-side surface S13 and an image-side surface S14. Light from an object sequentially passes through the surfaces S1 to S14 and finally forms an image on the image plane S15.

Alternatively, a diaphragm STO may be disposed between the first lens E1 and the second lens E2, to further improve the imaging quality of the lens assembly.

Table 1 shows the surface type, the radius of curvature, the thickness, the material and the conic coefficient of each lens of the optical imaging lens assembly in Embodiment 1. The radius of curvature and the thickness are both in millimeters (mm).

TABLE 1

| surface number | surface type | radius of curvature | thickness | material refractive index | abbe number | conic coefficient |
|---|---|---|---|---|---|---|
| OBJ | spherical | infinite | infinite | | | |
| S1 | aspheric | 1.7272 | 0.8616 | 1.55 | 56.1 | −0.0659 |
| S2 | aspheric | −300.0000 | 0.1715 | | | −99.0000 |
| STO | spherical | infinite | −0.1316 | | | 0.0000 |
| S3 | aspheric | 4.3000 | 0.2000 | 1.67 | 20.4 | −0.0430 |
| S4 | aspheric | 2.0031 | 0.3821 | | | −0.4327 |
| S5 | aspheric | 27.6682 | 0.4883 | 1.55 | 56.1 | −99.0000 |
| S6 | aspheric | 81.6135 | 0.1426 | | | 6.4447 |
| S7 | aspheric | 10.6340 | 0.3000 | 1.67 | 20.4 | −30.1263 |
| S8 | aspheric | 10.2058 | 0.2642 | | | −47.2874 |
| S9 | aspheric | 46.6403 | 0.6329 | 1.55 | 56.1 | 99.0000 |
| S10 | aspheric | −1.4594 | 0.3314 | | | −7.9410 |
| S11 | aspheric | −3.1532 | 0.3376 | 1.54 | 55.7 | −2.4362 |
| S12 | aspheric | 1.8205 | 0.2765 | | | −11.4393 |
| S13 | spherical | infinite | 0.1101 | 1.52 | 64.2 | |
| S14 | spherical | infinite | 0.5830 | | | |
| S15 | spherical | infinite | | | | |

As may be obtained from Table 1, the radius or curvature R3 of the object-side surface S3 of the second lens E2 and the radius of curvature R4 of the image-side surface S4 of the second lens E2 satisfy: R3/R4=2.15. The radius of curvature R7 of the object-side surface S7 of the fourth lens E4 and the radius of curvature R8 of the image-side surface S8 of the fourth lens E4 satisfy: (R7−R8)/(R7+R8)=0.02. The radius of curvature R11 of the object-side surface S11 of the sixth lens E6 and the radius of curvature R12 of the image-side surface S12 of the sixth lens E6 satisfy: R11/R12=−1.73. The center thickness CT2 of the second lens E2 on the optical axis and the spacing distance T12 between the first lens E1 and the second lens E2 on the optical axis satisfy: CT2/T12=5.02.

In this embodiment, each lens may be an aspheric lens. The surface type x of each aspheric surface is defined by the following formula:

$$x = \frac{ch^2}{1 + \sqrt{1 - (k+1)c^2 h^2}} + \sum A_i h^i. \quad (1)$$

Here, x is the sag—the axis-component of the displacement of the surface from the aspheric vertex, when the surface is at height h from the optical axis; c is the paraxial curvature of the aspheric surface, and c=1/R (i.e., the paraxial curvature c is the reciprocal of the radius of curvature R in Table 1 above); k is the conic coefficient (given in Table 1); and $A_i$ is the correction coefficient of the $i^{th}$ order of the aspheric surface. Table 2 below shows the high-order coefficients $A_4, A_6, A_8, A_{10}, A_{12}, A_{14}, A_{16}, A_{18}$, and $A_{20}$ applicable to the aspheric surfaces S1-S12 in Embodiment 1.

TABLE 2

| surface number | A4 | A6 | A8 | A10 | A12 | A14 | A16 | A18 | A20 |
|---|---|---|---|---|---|---|---|---|---|
| S1 | −8.7020E−03 | 4.4192E−02 | −1.3489E−01 | 2.5140E−01 | −3.0986E−01 | 2.4767E−01 | −1.2425E−01 | 3.5285E−02 | −4.3435E−03 |
| S2 | −8.2259E−02 | 4.7163E−01 | −1.3543E+00 | 2.5475E+00 | −3.2559E+00 | 2.7741E+00 | −1.5029E+00 | 4.6683E−01 | −6.3194E−02 |
| S3 | −1.9362E−01 | 7.1298E−01 | −1.8224E+00 | 3.3934E+00 | −4.3845E+00 | 3.8205E+00 | −2.1272E+00 | 6.8225E−01 | −9.5745E−02 |
| S4 | −1.2362E−01 | 2.2567E−01 | 1.9805E−01 | −2.5060E+00 | 7.7675E+00 | −1.2952E+01 | 1.2499E+01 | −6.5613E+00 | 1.4565E+00 |
| S5 | −8.4184E−02 | 1.2175E−01 | −6.1130E−01 | 1.5503E+00 | −2.4294E+00 | 2.0559E+00 | −6.6541E−01 | −1.8866E−01 | 1.3951E−01 |
| S6 | −1.4918E−01 | 1.6592E−02 | 2.0867E−01 | −7.4065E−01 | 1.0917E+00 | −9.3678E−01 | 4.8594E−01 | −1.3563E−01 | 1.3819E−02 |
| S7 | −2.3726E−01 | 1.5269E−01 | −1.7304E−01 | 4.0197E−01 | −8.2364E−01 | 8.8057E−01 | −4.8428E−01 | 1.3398E−01 | −1.5477E−02 |
| S8 | −1.8006E−01 | 4.8760E−02 | 2.9053E−02 | 5.7143E−03 | −1.0489E−01 | 1.1709E−01 | −5.5693E−02 | 1.2814E−02 | −1.2067E−03 |
| S9 | −2.8364E−02 | −5.2148E−02 | −1.7460E−02 | 1.0235E−01 | −1.0326E−01 | 4.8986E−02 | −1.1788E−02 | 1.3556E−03 | −5.8329E−05 |
| S10 | −1.1066E−01 | 1.6340E−01 | −2.4597E−01 | 2.2430E−01 | −1.1458E−01 | 3.4559E−02 | −6.2157E−03 | 6.2367E−04 | −2.7167E−05 |
| S11 | −1.2883E−01 | 2.7898E−02 | 2.7316E−03 | 8.9221E−03 | −7.2077E−03 | 2.2121E−03 | −3.4822E−04 | 2.8272E−05 | −9.4439E−07 |
| S12 | −1.2299E−01 | 7.9771E−02 | −4.5396E−02 | 2.0197E−02 | −6.5858E−03 | 1.4698E−03 | −2.0979E−04 | 1.7094E−05 | −5.9836E−07 |

Table 3 shows the effective focal lengths f1-f6 of the lenses in Embodiment 1, the total effective focal length f of the optical imaging lens assembly, the total track length TTL (i.e., the distance on the optical axis from the center of the object-side surface S1 of the first lens E1 to the image plane S15) of the optical imaging lens assembly, and the half of the diagonal length ImgH of the effective pixel area on the image plane S15 of the optical imaging lens assembly.

TABLE 3

| | parameter | | | | | | | |
|---|---|---|---|---|---|---|---|---|
| | f1 (mm) | f2 (mm) | f3 (mm) | f4 (mm) | f5 (mm) | f6 (mm) | f (mm) | TTL (mm) | ImgH (mm) |
| numerical value | 3.15 | −5.84 | 76.43 | −528.83 | 2.60 | −2.10 | 4.06 | 4.95 | 3.33 |

As may be obtained from Table 3, the effective focal length f2 of the second lens E2 and the total effective focal length f of the optical imaging lens assembly satisfy: f2/f=−1.44. The effective focal length f5 of the fifth lens E5 and the total effective focal length f of the optical imaging lens assembly satisfy: f5/f=0.64. The total track length TTL of the optical imaging lens assembly and the half of the diagonal length ImgH of the effective pixel area on the image plane S15 of the optical imaging lens assembly satisfy: TTL/ImgH=1.49.

It may be seen by combining Table 1 with Table 3 that the total effective focal length f of the optical imaging lens assembly and the radius of curvature R10 of the image-side surface S10 of the fifth lens E5 satisfy: f/R10=−2.78. The effective focal length f1 of the first lens E1 and the center thickness CT1 of the first lens E1 on the optical axis satisfy: f1/CT1=3.65. The sum ΣCT of the center thicknesses of the first to sixth lenses E1-E6 on the optical axis and the total track length TTL of the optical imaging lens assembly satisfy: ΣCT/TTL=0.57.

In Embodiment 1, the total effective focal length f of the optical imaging lens assembly and the entrance pupil diameter EPD of the optical imaging lens assembly satisfy: f/EPD=1.58.

FIG. 2A illustrates the longitudinal aberration curve of the optical imaging lens assembly according to Embodiment 1, representing deviations of focal points of light of different wavelengths converged after passing through the lens assembly. FIG. 2B illustrates the astigmatic curve of the optical imaging lens assembly according to Embodiment 1, representing a curvature of the tangential image plane and a curvature of the sagittal image plane. FIG. 2C illustrates the distortion curve of the optical imaging lens assembly according to Embodiment 1, representing amounts of distortion at different viewing angles. FIG. 2D illustrates the lateral color curve of the optical imaging lens assembly according to Embodiment 1, representing deviations of different image heights on the image plane after light passes through the lens assembly. It can be seen from FIGS. 2A-2D that the optical imaging lens assembly according to Embodiment 1 can achieve a good imaging quality.

Embodiment 2

An optical imaging lens assembly according to Embodiment 2 of the present disclosure is described below with reference to FIGS. 3-4D. In this embodiment and the following embodiments, for the purpose of brevity, the description of parts similar to those in Embodiment 1 will be omitted. FIG. 3 is a schematic structural diagram illustrating the optical imaging lens assembly according to Embodiment 2 of the present disclosure.

As shown in FIG. 3, the optical imaging lens assembly includes, sequentially from an object side to an image side along an optical axis, a first lens E1, a second lens E2, a third lens E3, a fourth lens E4, a fifth lens E5, a sixth lens E6, and an image plane S15.

The first lens E1 has a positive refractive power, an object-side surface S1 of the first lens E1 is a convex surface, and an image-side surface S2 of the first lens E1 is a convex surface. The object-side surface S1 and the image-side surface S2 of the first lens E1 are both aspheric surfaces.

The second lens E2 has a negative refractive power, an object-side surface S3 of the second lens E2 is a convex surface, and an image-side surface S4 of the second lens E2 is a concave surface. The object-side surface S3 and the image-side surface S4 of the second lens E2 are both aspheric surfaces.

The third lens E3 has a positive refractive power, an object-side surface S5 of the third lens E3 is a convex surface, and an image-side surface S6 of the third lens E3 is a concave surface. The object-side surface S5 and the image-side surface S6 of the third lens E3 are both aspheric surfaces.

The fourth lens E4 has a negative refractive power, an object-side surface S7 of the fourth lens E4 is a convex surface, and an image-side surface S8 of the fourth lens E4 is a concave surface. The object-side surface S7 and the image-side surface S8 of the fourth lens E4 are both aspheric surfaces.

The fifth lens E5 has a positive refractive power, an object-side surface S9 of the fifth lens E5 is a convex surface, and an image-side surface S10 of the fifth lens E5 is a convex surface. The object-side surface S9 and the image-side surface S10 of the fifth lens E5 are both aspheric surfaces.

The sixth lens E6 has a negative refractive power, an object-side surface S11 of the sixth lens E6 is a concave surface, and an image-side surface S12 of the sixth lens E6 is a concave surface. The object-side surface S11 and the image-side surface S12 of the sixth lens E6 are both aspheric surfaces.

Alternatively, the optical imaging lens assembly may further include an optical filter E7 having an object-side surface S13 and an image-side surface S14. Light from an object sequentially passes through the surfaces S1-S14 and finally forms an image on the image plane S15.

Alternatively, a diaphragm STO may be disposed between the first lens E1 and the second lens E2, to further improve the imaging quality of the lens assembly.

Table 4 shows the surface type, the radius of curvature, the thickness, the material and the conic coefficient of each lens of the optical imaging lens assembly in Embodiment 2. The radius of curvature and the thickness are both in millimeters (mm). Table 5 shows the high-order coefficients applicable to each aspheric surface in Embodiment 2. The surface type of each aspheric surface may be defined by the formula (1) given in Embodiment 1. Table 6 shows the effective focal lengths f1-f6 of the lenses in Embodiment 2, the total effective focal length f of the optical imaging lens assembly, the total track length TTL of the optical imaging lens assembly, and the half of the diagonal length ImgH of the effective pixel area on the image plane S15 of the optical imaging lens assembly.

TABLE 4

| surface number | surface type | radius of curvature | thickness | material refractive index | abbe number | conic coefficient |
|---|---|---|---|---|---|---|
| OBJ | spherical | infinite | infinite | | | |
| S1 | aspheric | 1.7349 | 0.8401 | 1.55 | 56.1 | −0.0623 |
| S2 | aspheric | −300.0000 | 0.1698 | | | 99.0000 |
| STO | spherical | infinite | −0.1323 | | | 0.0000 |
| S3 | aspheric | 4.1033 | 0.2131 | 1.67 | 20.4 | −0.2905 |
| S4 | aspheric | 1.9770 | 0.3741 | | | −0.4310 |
| S5 | aspheric | 26.0815 | 0.4975 | 1.55 | 56.1 | 70.1957 |
| S6 | aspheric | 1153.4842 | 0.1515 | | | −99.0000 |
| S7 | aspheric | 10.9263 | 0.3002 | 1.67 | 20.4 | −73.9108 |
| S8 | aspheric | 9.4521 | 0.2566 | | | −71.4813 |
| S9 | aspheric | 52.6000 | 0.6456 | 1.55 | 56.1 | −5.7616 |
| S10 | aspheric | −1.4756 | 0.3488 | | | −7.5842 |
| S11 | aspheric | −3.1802 | 0.3611 | 1.54 | 55.7 | −2.1898 |
| S12 | aspheric | 1.7893 | 0.2037 | | | −10.3010 |
| S13 | spherical | infinite | 0.2100 | 1.52 | 64.2 | |
| S14 | spherical | infinite | 0.5102 | | | |
| S15 | spherical | infinite | | | | |

TABLE 5

| surface number | A4 | A6 | A8 | A10 | A12 | A14 | A16 | A18 | A20 |
|---|---|---|---|---|---|---|---|---|---|
| S1 | −6.1101E−03 | 3.1439E−02 | −8.9566E−02 | 1.5435E−01 | −1.8151E−01 | 1.4256E−01 | 7.2716E−02 | 2.1542E−02 | −2.8330E−03 |
| S2 | −9.2268E−02 | 5.4352E−01 | −1.6241E+00 | 3.1817E+00 | −4.2279E+00 | 3.7432E+00 | −2.1076E+00 | 6.8094E−01 | −9.5964E−02 |
| S3 | −1.9744E−01 | 7.6443E−01 | −2.0778E+00 | 4.1021E+00 | −5.6244E+00 | 5.2100E+00 | −3.0933E+00 | 1.0612E+00 | −1.5982E−01 |
| S4 | −1.1838E−01 | 1.9991E−01 | 2.9053E−01 | −2.7826E+00 | 8.3617E+00 | −1.3811E+01 | 1.3289E+01 | −6.9782E+00 | 1.5519E+00 |
| S5 | −7.5923E−02 | 6.8477E−02 | −3.5453E−01 | 8.1482E−01 | −1.0732E+00 | 4.8030E−01 | 4.6040E−01 | −6.4471E−01 | 2.2079E−01 |
| S6 | −1.4081E−01 | −8.5931E−03 | 2.1680E−01 | −6.0420E−01 | 7.5269E−01 | −5.5242E−01 | 2.5005E−01 | −6.1268E−02 | 4.7835E−03 |
| S7 | −2.2472E−01 | 8.8168E−02 | −9.5755E−02 | 4.2407E−01 | −9.5762E−01 | 9.9998E−01 | −5.2144E−01 | 1.3225E−01 | −13205E−02 |
| S8 | −1.6598E−01 | 1.1222E−02 | 4.5843E−02 | 7.5553E−02 | −2.4169E−01 | 2.3158E−01 | −1.0678E−01 | 2.4636E−02 | −2.3229E−03 |
| S9 | −2.2140E−02 | −5.1336E−02 | −5.0694E−02 | 1.8526E−01 | −1.9912E−01 | 1.1086E−01 | −3.4800E−02 | 5.9631E−03 | −4.4251E−04 |
| S10 | −1.0020E−01 | 1.3369E−01 | −2.0158E−01 | 1.8463E−01 | −9.3479E−02 | 2.7770E−02 | −4.9039E−03 | 4.8213E−04 | −2.0530E−05 |
| S11 | −1.2241E−01 | 2.1709E−02 | 5.7886E−03 | 7.2993E−03 | 6.4772E−03 | 2.0076E−03 | −3.1549E−04 | 2.5490E−05 | −8.4626E−07 |
| S12 | −1.1308E−01 | 7.0053E−01 | −3.7150E−02 | 1.4919E−02 | −4.3075E−03 | 8.4665E−04 | −1.0698E−04 | 7.8073E−06 | −2.4806E−07 |

TABLE 6

| parameter | f1 (mm) | f2 (mm) | f3 (mm) | f4 (mm) | f5 (mm) | f6 (mm) | f (min) | TTL (mm) | ImgH (min) |
|---|---|---|---|---|---|---|---|---|---|
| numerical value | 3.16 | −5.97 | 48.87 | −114.56 | 2.64 | −2.08 | 3.99 | 4.95 | 3.34 |

Figure 4B:
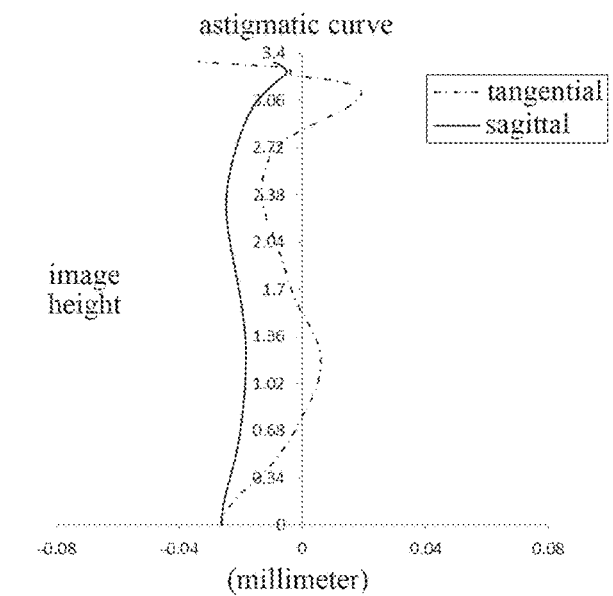
Figure 4C:
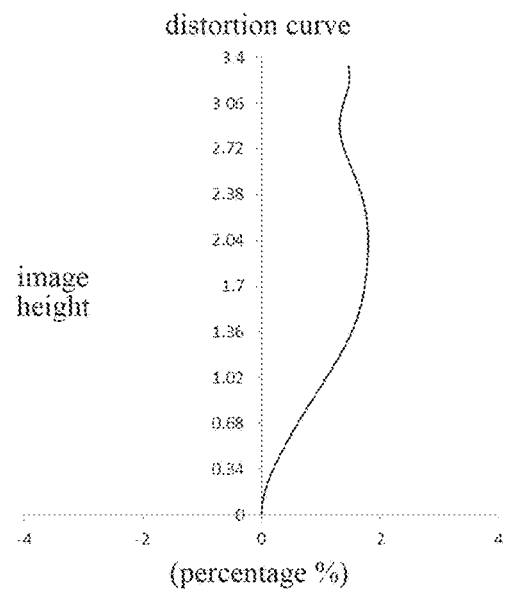
Figure 4D:
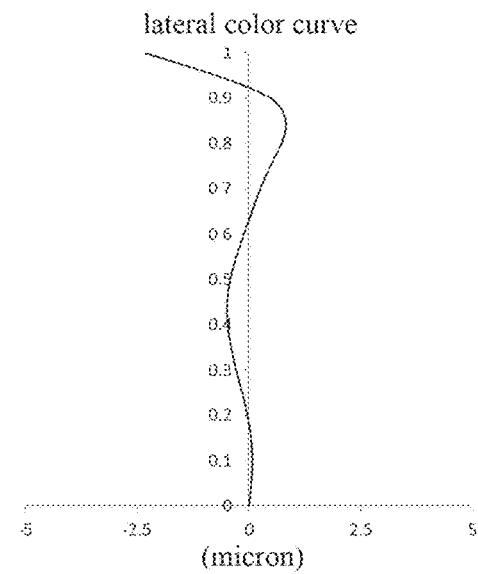

FIG. 4A illustrates the longitudinal aberration curve of the optical imaging lens assembly according to Embodiment 2, representing deviations of focal points of light of different wavelengths converged after passing through the lens assembly. FIG. 4B illustrates the astigmatic curve of the optical imaging lens assembly according to Embodiment 2, representing a curvature of the tangential image plane and a curvature of the sagittal image plane. FIG. 4C illustrates the distortion curve of the optical imaging lens assembly according to Embodiment 2, representing amounts of distortion at different viewing angles. FIG. 4D illustrates the lateral color curve of the optical imaging lens assembly according to Embodiment 2, representing deviations of different image heights on the image plane after light passes through the lens assembly. It can be seen from FIGS. 4A-4D that the optical imaging lens assembly according to Embodiment 2 can achieve a good imaging quality.

Embodiment 3

An optical imaging lens assembly according to Embodiment 3 of the present disclosure is described below with reference to FIGS. 5-6D. FIG. 5 is a schematic structural diagram illustrating the optical imaging lens assembly according to Embodiment 3 of the present disclosure.

As shown in FIG. 5, the optical imaging lens assembly includes, sequentially from an object side to an image side along an optical axis, a first lens E1, a second lens E2, a third lens E3, a fourth lens E4, a fifth lens E5, a sixth lens E6, and an image plane S15.

The first lens E1 has a positive refractive power, an object-side surface S1 of the first lens E1 is a convex surface, and an image-side surface S2 of the first lens E1 is a concave surface. The object-side surface S1 and the image-side surface S2 of the first lens E1 are both aspheric surfaces.

The second lens E2 has a negative refractive power, an object-side surface S3 of the second lens E2 is a convex surface, and an image-side surface S4 of the second lens E2 is a concave surface. The object-side surface S3 and the image-side surface S4 of the second lens E2 are both aspheric surfaces.

The third lens E3 has a positive refractive power, an object-side surface S5 of the third lens E3 is a concave surface, and an image-side surface S6 of the third lens E3 is a convex surface. The object-side surface S5 and the image-side surface S6 of the third lens E3 are both aspheric surfaces.

The fourth lens E4 has a negative refractive power, an object-side surface S7 of the fourth lens E4 is a convex surface, and an image-side surface S8 of the fourth lens E4 is a concave surface. The object-side surface S7 and the image-side surface S8 of the fourth lens E4 are both aspheric surfaces.

The fifth lens E5 has a positive refractive power, an object-side surface S9 of the fifth lens E5 is a convex surface, and an image-side surface S10 of the fifth lens E5 is a convex surface. The object-side surface S9 and the image-side surface S10 of the fifth lens E5 are both aspheric surfaces.

The sixth lens E6 has a negative refractive power, an object-side surface S11 of the sixth lens E6 is a concave surface, and an image-side surface S12 of the sixth lens E6 is a concave surface. The object-side surface S11 and the image-side surface S12 of the sixth lens E6 are both aspheric surfaces.

Alternatively, the optical imaging lens assembly may further include an optical filter E7 having an object-side surface S13 and an image-side surface S14. Light from an object sequentially passes through the surfaces S1-S14 and finally forms an image on the image plane S15.

Alternatively, a diaphragm STO may be disposed between the first lens E1 and the second lens E2, to further improve the imaging quality of the lens assembly.

Table 7 shows the surface type, the radius of curvature, the thickness, the material and the conic coefficient of each lens of the optical imaging lens assembly in Embodiment 3. The radius of curvature and the thickness are both in millimeters (mm). Table 8 shows the high-order coefficients applicable to each aspheric surface in Embodiment 3. The surface type of each aspheric surface may be defined by the formula (1) given in Embodiment 1. Table 9 shows the effective focal lengths f1-f6 of the lenses in Embodiment 3, the total effective focal length f of the optical imaging lens assembly, the total track length TTL of the optical imaging lens assembly, and the half of the diagonal length ImgH of the effective pixel area on the image plane S15 of the optical imaging lens assembly.

TABLE 7

| surface number | surface type | radius of curvature | thickness | refractive index | abbe number | conic coefficient |
|---|---|---|---|---|---|---|
| OBJ | spherical | infinite | infinite | | | |
| S1 | aspheric | 1.7217 | 0.8417 | 1.55 | 56.1 | −0.0294 |
| S2 | aspheric | 52.7404 | 0.1614 | | | −84.9880 |
| STO | spherical | infinite | −0.1239 | | | 0.0000 |
| S3 | aspheric | 3.8732 | 0.2000 | 1.67 | 20.4 | −0.6861 |
| S4 | aspheric | 2.0244 | 0.3923 | | | −0.3329 |
| S5 | aspheric | −667.1407 | 0.4916 | 1.55 | 56.1 | −99.0000 |
| S6 | aspheric | −52.4415 | 0.1294 | | | 99.0000 |
| S7 | aspheric | 10.3656 | 0.3023 | 1.67 | 20.4 | −79.6274 |
| S8 | aspheric | 10.1402 | 0.2808 | | | −49.0334 |
| S9 | aspheric | 35.6847 | 0.6477 | 1.55 | 56.1 | 59.8930 |
| S10 | aspheric | −1.4947 | 0.3374 | | | −7.9801 |
| S11 | aspheric | −3.2103 | 0.3622 | 1.54 | 55.7 | −2.3123 |
| S12 | aspheric | 1.7521 | 0.2054 | | | −10.6502 |
| S13 | spherical | infinite | 0.2100 | 1.52 | 64.2 | |
| S14 | spherical | infinite | 0.5119 | | | |
| S15 | spherical | infinite | | | | |

TABLE 8

| surface number | A4 | A6 | A8 | A10 | A12 | A14 | A16 | A18 | A20 |
|---|---|---|---|---|---|---|---|---|---|
| S1 | −7.6320E−03 | 4.2162E−02 | −1.2865E−01 | 2.4608E−01 | −3.1443E−01 | 2.6379E−01 | −1.4009E−01 | 4.2462E−02 | −5.6230E−03 |
| S2 | −8.0542E−02 | 4.4699E−01 | −1.2798E+00 | 2.4335E+00 | −3.1689E+00 | 2.7715E+00 | −1.5517E+00 | 5.0109E−01 | −7.0899E−02 |
| S3 | −1.7819E−01 | 6.3982E−01 | −1.6557E+00 | 3.1674E+00 | −4.2575E+00 | 3.9138E+00 | −2.3318E+00 | 8.1089E−01 | −1.2489E−01 |
| S4 | −1.0658E−01 | 1.6579E−01 | 3.0978E−01 | −2.5703E+00 | 7.4932E+00 | −1.2146E+01 | 1.1514E+01 | −5.9673E+00 | 1.3114E+00 |
| S5 | −7.1994E−02 | 7.0692E−02 | −4.2131E−01 | 1.1357E+00 | −1.8958E+00 | 1.7499E+00 | −7.1414E−01 | −4.0835E−02 | 8.7490E−02 |

TABLE 8-continued

| surface number | A4 | A6 | A8 | A10 | A12 | A14 | A16 | A18 | A20 |
|---|---|---|---|---|---|---|---|---|---|
| S6  | −1.5281E−01 | −3.9631E−03 |  2.9851E−01 | −8.8206E−01 |  1.2499E+00 | −1.1032E+00 |  6.3003E−01 | −2.1103E−01 |  3.0452E−02 |
| S7  | −2.2938E−01 |  8.4816E−02 |  9.8406E−03 |  1.1087E−01 | −4.9323E−01 |  5.8834E−01 | −2.9957E−01 |  6.4548E−02 | −4.1625E−03 |
| S8  | −1.6578E−01 |  9.1442E−03 |  1.0467E−01 | −8.6646E−02 | −3.2912E−02 |  7.7218E−02 | −3.9213E−02 |  8.3595E−03 | −6.6061E−04 |
| S9  | −2.2478E−02 | −5.0185E−02 | −2.2082E−02 |  1.2258E−01 | −1.3640E−01 |  7.4855E−02 | −2.2358E−02 |  3.5164E−03 | −2.3145E−04 |
| S10 | −1.0162E−01 |  1.3472E−01 | −1.9858E−01 |  1.8208E−01 | −9.3459E−02 |  2.8323E−02 | −5.1157E−03 |  5.1401E−04 | −2.2277E−05 |
| S11 | −1.2920E−01 |  2.8849E−02 |  2.2501E−03 |  8.4625E−03 | −6.7319E−03 |  2.0391E−03 | −3.1662E−04 |  2.5336E−05 | −8.3322E−07 |
| S12 | −1.0730E−01 |  6.2564E−02 | −3.0571E−02 |  1.1335E−02 | −3.0617E−03 |  5.7030E−04 | −6.9216E−05 |  4.9269E−06 | −1.5482E−07 |

TABLE 9

| | parameter | | | | | | | | |
|---|---|---|---|---|---|---|---|---|---|
| | f1 (mm) | f2 (mm) | f3 (mm) | f4 (mm) | f5 (mm) | f6 (mm) | f (mm) | TTL (mm) | ImgH (mm) |
| numerical value | 3.24 | −6.66 | 104.22 | −1509.83 | 2.64 | −2.06 | 3.99 | 4.95 | 3.33 |

FIG. 6A illustrates the longitudinal aberration curve of the optical imaging lens assembly according to Embodiment 3, representing deviations of focal points of light of different wavelengths converged after passing through the lens assembly. FIG. 6B illustrates the astigmatic curve of the optical imaging lens assembly according to Embodiment 3, representing a curvature of the tangential image plane and a curvature of the sagittal image plane. FIG. 6C illustrates the distortion curve of the optical imaging lens assembly according to Embodiment 3, representing amounts of distortion at different viewing angles. FIG. 6D illustrates the lateral color curve of the optical imaging lens assembly according to Embodiment 3, representing deviations of different image heights on the image plane after light passes through the lens assembly. It can be seen from FIGS. 6A-6D that the optical imaging lens assembly according to Embodiment 3 can achieve a good imaging quality.

Embodiment 4

An optical imaging lens assembly according to Embodiment 4 of the present disclosure is described below with reference to FIGS. 7-8D. FIG. 7 is a schematic structural diagram illustrating the optical imaging lens assembly according to Embodiment 4 of the present disclosure.

As shown in FIG. 7, the optical imaging lens assembly includes, sequentially from an object side to an image side along an optical axis, a first lens E1, a second lens E2, a third lens E3, a fourth lens E4, a fifth lens E5, a sixth lens E6, and an image plane S15.

The first lens E1 has a positive refractive power, an object-side surface S1 of the first lens E1 is a convex surface, and an image-side surface S2 of the first lens E1 is a concave surface. The object-side surface S1 and the image-side surface S2 of the first lens E1 are both aspheric surfaces.

The second lens E2 has a negative refractive power, an object-side surface S3 of the second lens E2 is a convex surface, and an image-side surface S4 of the second lens E2 is a concave surface. The object-side surface S3 and the image-side surface S4 of the second lens E2 are both aspheric surfaces.

The third lens E3 has a positive refractive power, an object-side surface S5 of the third lens E3 is a convex surface, and an image-side surface S6 of the third lens E3 is a concave surface. The object-side surface S5 and the image-side surface S6 of the third lens E3 are both aspheric surfaces.

The fourth lens E4 has a negative refractive power, an object-side surface S7 of the fourth lens E4 is a convex surface, and an image-side surface S8 of the fourth lens E4 is a concave surface. The object-side surface S7 and the image-side surface S8 of the fourth lens E4 are both aspheric surfaces.

The fifth lens E5 has a positive refractive power, an object-side surface S9 of the fifth lens E5 is a convex surface, and an image-side surface 310 of the fifth lens E5 is a convex surface. The object-side surface S9 and the image-side surface 310 of the fifth lens E5 are both aspheric surfaces.

The sixth lens E6 has a negative refractive power, an object-side surface S11 of the sixth lens E6 is a concave surface, and an image-side surface S12 of the sixth lens E6 is a concave surface. The object-side surface S11 and the image-side surface S12 of the sixth lens E6 are both aspheric surfaces.

Alternatively, the optical imaging lens assembly may further include an optical filter E7 having an object-side surface S13 and an image-side surface S14. Light from an object sequentially passes through the surfaces S1-S14 and finally forms an image on the image plane S15.

Alternatively, a diaphragm STO may be disposed between the first lens E1 and the second lens E2, to further improve the imaging quality of the lens assembly.

Table 10 shows the surface type, the radius of curvature, the thickness, the material and the conic coefficient of each lens of the optical imaging lens assembly in Embodiment 4. The radius of curvature and the thickness are both in millimeters (mm). Table 11 shows the high-order coefficients applicable to each aspheric surface in Embodiment 4. The surface type of each aspheric surface may be defined by the formula (1) given in Embodiment 1. Table 12 shows the effective focal lengths f1-f6 of the lenses in Embodiment 4, the total effective focal length f of the optical imaging lens assembly, the total track length TTL of the optical imaging lens assembly, and the half of the diagonal length ImgH of the effective pixel area on the image plane S15 of the optical imaging lens assembly.

TABLE 10

| surface number | surface type | radius of curvature | thickness | material refractive index | abbe number | conic coefficient |
|---|---|---|---|---|---|---|
| OBJ | spherical | infinite | infinite | | | |
| S1 | aspheric | 1.7084 | 0.8445 | 1.55 | 56.1 | −0.0146 |
| S2 | aspheric | 30.3421 | 0.1572 | | | −99.0000 |
| STO | spherical | infinite | −0.1107 | | | 0.0000 |
| S3 | aspheric | 3.9025 | 0.2000 | 1.67 | 20.4 | −0.9770 |
| S4 | aspheric | 2.0408 | 0.3724 | | | −0.2702 |
| S5 | aspheric | 40.0010 | 0.4901 | 1.55 | 56.1 | 76.1151 |
| S6 | aspheric | 200.0000 | 0.1273 | | | 99.0000 |
| S7 | aspheric | 11.9208 | 0.3130 | 1.67 | 20.4 | −90.6897 |
| S8 | aspheric | 11.7252 | 0.2809 | | | −50.5461 |
| S9 | aspheric | 37.1488 | 0.6560 | 1.55 | 56.1 | −64.2288 |
| S10 | aspheric | −1.4643 | 0.3279 | | | −7.7275 |
| S11 | aspheric | −3.2042 | 0.3627 | 1.54 | 55.7 | −2.4134 |
| S12 | aspheric | 1.7287 | 0.2060 | | | −10.8324 |
| S13 | spherical | infinite | 0.2100 | 1.52 | 64.2 | |
| S14 | spherical | infinite | 0.5125 | | | |
| S15 | spherical | infinite | | | | |

TABLE 11

| surface number | A4 | A6 | A8 | A10 | A12 | A14 | A16 | A18 | A20 |
|---|---|---|---|---|---|---|---|---|---|
| S1 | −6.7477E−03 | 3.7494E−02 | −1.1806E−01 | 2.3699E−01 | −3.1728E−01 | 2.7739E−01 | −1.5228E−01 | 4.7390E−02 | −6.4045E−03 |
| S2 | −7.3915E−02 | 3.7606E−01 | −1.0274E+00 | 1.9235E+00 | −2.5140E+00 | 2.2296E+00 | −1.2722E+00 | 4.1963E−01 | −6.0698E−02 |
| S3 | −1.7138E−01 | 5.7533E−01 | −1.4219E+00 | 2.6899E+00 | −3.6466E+00 | 3.4130E+00 | −2.0776E+00 | 7.3885E−01 | −1.1643E−01 |
| S4 | −1.0802E−01 | 1.8623E−01 | 1.8514E−01 | −2.0921E+00 | 6.3942E+00 | −1.0617E+01 | 1.0253E+01 | −5.4034E+00 | 1.2074E+00 |
| S5 | −7.3524E−02 | 8.4458E−02 | −4.4967E−01 | 1.1804E+00 | −1.9425E+00 | 1.7697E+00 | −6.8553E−01 | −8.7327E−02 | 1.0779E−01 |
| S6 | −1.5869E−01 | 4.2668E−02 | 1.3659E−01 | −5.1225E−01 | 6.8022E−01 | −5.3751E−01 | 2.7964E−01 | −8.5310E−02 | 1.0240E−02 |
| S7 | −2.3669E−01 | 1.1880E−01 | −7.2324E−02 | 2.2107E−01 | −5.6943E−01 | 5.83641E−01 | −2.5181E−01 | 3.5433E−02 | 1.3755E−03 |
| S8 | −1.6945E−01 | 2.9734E−02 | 5.9894E−02 | −2.7645E−01 | −8.6924E−01 | 1.1376E−01 | −5.6398E−02 | 1.3109E−02 | −1.2224E−03 |
| S9 | −2.4034E−02 | −4.8191E−02 | −6.7236E−03 | 8.6577E−02 | −9.9652E−02 | 5.4117E−02 | −1.5789E−02 | 2.4389E−03 | −1.6141E−04 |
| S10 | −1.0394E−01 | 1.3592E−01 | −1.9129E−01 | 1.7041E−01 | −8.5530E−02 | 2.5369E−02 | −4.4856E−03 | 4.4153E−04 | −1.8781E−05 |
| S11 | −1.3271E−01 | 3.9358E−02 | −9.3007E−03 | 1.5104E−02 | −9.0156E−03 | 2.5279E−03 | −3.8065E−04 | 3.0046E−05 | −9.8253E−07 |
| S12 | −1.0663E−01 | 6.3151E−02 | −3.1647E−02 | 1.2025E−02 | −3.3170E−03 | 6.2901E−04 | −7.7517E−05 | 5.5859E−06 | −1.7714E−07 |

TABLE 12

| | parameter | | | | | | | | |
|---|---|---|---|---|---|---|---|---|---|
| | f1 (mm) | f2 (mm) | f3 (mm) | f4 (mm) | f5 (mm) | f6 (mm) | f (mm) | TTL (mm) | ImgH (mm) |
| numerical value | 3.28 | −6.71 | 91.49 | −2978.74 | 2.60 | −2.04 | 3.99 | 4.95 | 3.34 |

Figure 8A:
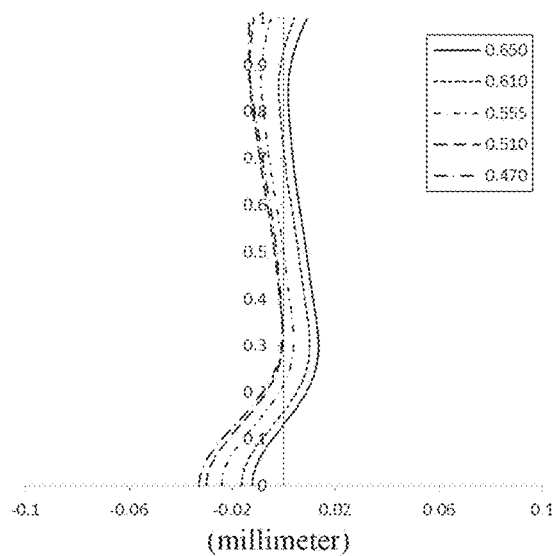
FIGS. 8A-8D respectively illustrate a longitudinal aberration curve, an astigmatic curve, a distortion curve, and a lateral color curve of the optical imaging lens assembly according to Embodiment 4.
Figure 8B:
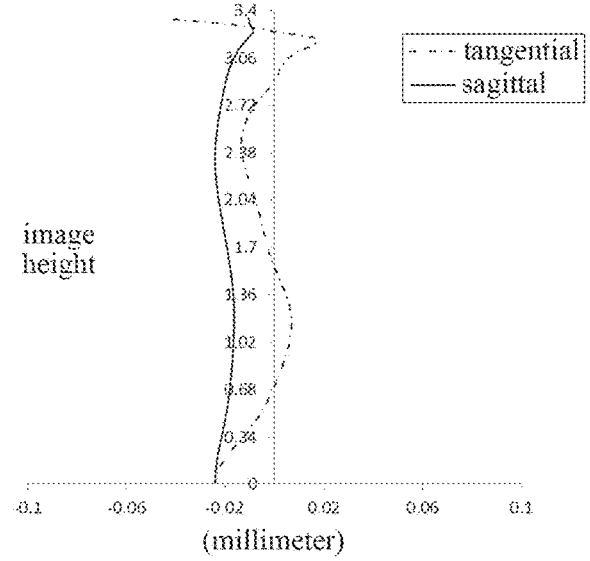
Figure 8C:
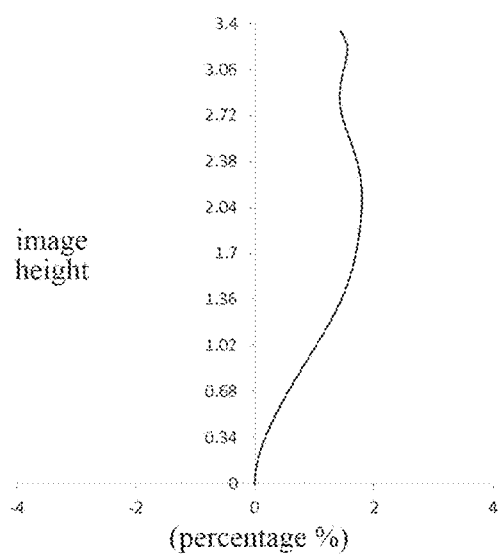
Figure 8D:
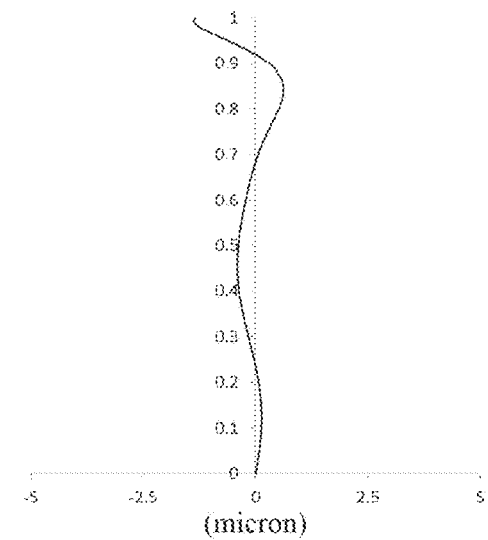

FIG. 8A illustrates the longitudinal aberration curve of the optical imaging lens assembly according to Embodiment 4, representing deviations of focal points of light of different wavelengths converged after passing through the lens assembly. FIG. 8B illustrates the astigmatic curve of the lens assembly according to Embodiment 4, representing a curvature of the tangential image plane and a curvature of the sagittal image plane. FIG. 8C illustrates the distortion curve of the optical imaging lens assembly according to Embodiment 4, representing amounts of distortion at different viewing angles. FIG. 8D illustrates the lateral color curve of the lens assembly according to Embodiment 4, representing deviations of different image heights on the image plane after light passes through the lens assembly. It can be seen from FIGS. 8A-8D that the optical imaging lens assembly according to Embodiment 4 can achieve a good imaging quality.

Embodiment 5

An optical imaging lens assembly according to Embodiment 5 of the present disclosure is described below with reference to FIGS. 9-10D. FIG. 9 is a schematic structural diagram illustrating the optical imaging lens assembly according to Embodiment 5 of the present disclosure.

As shown in FIG. 9, the optical imaging lens assembly includes, sequentially from an object side to an image side along an optical axis, a first lens E1, a second lens E2, a third lens E3, a fourth lens E4, a fifth lens E5, a sixth lens E6, and an image plane S15.

The first lens E1 has a positive refractive power, an object-side surface S1 of the first lens E1 is a convex surface, and an image-side surface S2 of the first lens E1 is a concave surface. The object-side surface S1 and the image-side surface S2 of the first lens E1 are both aspheric surfaces.

The second lens E2 has a negative refractive power, an object-side surface S3 of the second lens E2 is a convex surface, and an image-side surface S4 of the second lens E2 is a concave surface. The object-side surface S3 and the image-side surface S4 of the second lens E2 are both aspheric surfaces.

The third lens E3 has a positive refractive power, an object-side surface S5 of the third lens E3 is a convex surface, and an image-side surface S6 of the third lens E3 is a convex surface. The object-side surface S5 and the image-side surface S6 of the third lens E3 are both aspheric surfaces.

The fourth lens E4 has a negative refractive power, an object-side surface S7 of the fourth lens E4 is a concave surface, and an image-side surface S8 of the fourth lens E4 is a concave surface. The object-side surface S7 and the image-side surface S8 of the fourth lens E4 are both aspheric surfaces.

The fifth lens E5 has a positive refractive power, an object-side surface S9 of the fifth lens E5 is a convex surface, and an image-side surface S10 of the fifth lens E5 is a convex surface. The object-side surface S9 and the image-side surface S10 of the fifth lens E5 are both aspheric surfaces.

The sixth lens E6 has a negative refractive power, an object-side surface S11 of the sixth lens E6 is a concave surface, and an image-side surface S12 of the sixth lens E6 is a concave surface. The object-side surface S11 and the image-side surface S12 of the sixth lens E6 are both aspheric surfaces.

Alternatively, the optical imaging lens assembly may further include an optical filter E7 having an object-side surface S13 and an image-side surface S14. Light from an object sequentially passes through the surfaces S1-S14 and finally forms an image on the image plane S15.

Alternatively, a diaphragm STO may be disposed between the first lens E1 and the second lens E2, to further improve the imaging quality of the lens assembly.

Table 13 shows the surface type, the radius of curvature, the thickness, the material and the conic coefficient of each lens of the optical imaging lens assembly in Embodiment 5. The radius of curvature and the thickness are both in millimeters (mm). Table 14 shows the high-order coefficients applicable to each aspheric surface in Embodiment 5. The surface type of each aspheric surface may be defined by the formula (1) given in Embodiment 1. Table 15 shows the effective focal lengths f1-f6 of the lenses in Embodiment 5, the total effective focal length f of the optical imaging lens assembly, the total track length TTL of the optical imaging lens assembly, and the half of the diagonal length ImgH of the effective pixel area on the image plane S15 of the optical imaging lens assembly.

TABLE 13

| surface number | surface type | radius of curvature | thickness | material refractive index | abbe number | conic coefficient |
|---|---|---|---|---|---|---|
| OBJ | spherical | infinite | infinite | | | |
| S1 | aspheric | 1.7083 | 0.8485 | 1.55 | 56.1 | −0.0033 |
| S2 | aspheric | 33.1558 | 0.1555 | | | −99.0000 |
| STO | spherical | infinite | −0.1161 | | | 0.0000 |
| S3 | aspheric | 4.2450 | 0.2000 | 1.67 | 20.4 | −0.8984 |
| S4 | aspheric | 2.1379 | 0.3611 | | | −0.2420 |
| S5 | aspheric | 40.3454 | 0.5025 | 1.55 | 56.1 | −99.0000 |
| S6 | aspheric | −40.3289 | 0.1281 | | | −99.0000 |
| S7 | aspheric | −200.0000 | 0.3017 | 1.67 | 20.4 | 99.0000 |
| S8 | aspheric | 57.7250 | 0.2756 | | | 99.0000 |
| S9 | aspheric | 40.2117 | 0.6549 | 1.55 | 56.1 | −99.0000 |
| S10 | aspheric | −1.4642 | 0.3351 | | | −7.6092 |
| S11 | aspheric | −3.1157 | 0.3716 | 1.54 | 55.7 | −2.3565 |
| S12 | aspheric | 1.7307 | 0.2076 | | | −11.1808 |
| S13 | spherical | infinite | 0.2100 | 1.52 | 64.2 | |
| S14 | spherical | infinite | 0.5141 | | | |
| S15 | spherical | infinite | | | | |

TABLE 14

| surface number | A4 | A6 | A8 | A10 | A12 | A14 | A16 | A18 | A20 |
|---|---|---|---|---|---|---|---|---|---|
| S1 | −6.8592E−03 | 3.9455E−02 | −1.2493E−01 | 2.5518E−01 | −3.4688E−01 | 3.0746E−01 | −1.7070E−01 | 5.3604E−02 | −7.2944E−03 |
| S2 | −9.7394E−02 | 5.0600E−01 | −1.4157E+00 | 2.6897E+00 | −3.5407E+00 | 3.1505E+00 | −1.8000E+00 | 5.9380E−01 | −8.5838E−02 |
| S3 | −1.9426E−01 | 7.1008E−01 | −1.8279E+00 | 3.4927E+00 | −4.7357E+00 | 4.4150E+00 | −2.6731E+00 | 9.4467E−01 | −1.4780E−01 |
| S4 | −1.1079E−01 | 1.9965E−01 | 2.2466E−01 | −2.4925E+00 | 7.6641E+00 | −1.2811E+01 | 1.2454E+01 | −6.6082E+00 | 1.4870E+00 |
| S5 | −6.8889E−02 | 1.0668E−02 | −2.0201E−02 | −3.9764E−01 | 1.7836E+00 | −3.8487E+00 | 4.5276E+00 | −2.7934E+00 | 7.0906E−01 |
| S6 | −1.4088E−01 | −2.0997E−02 | 3.1098E−01 | −9.2031E−01 | 1.4043E+00 | −1.4238E+00 | 9.5946E−01 | −3.7343E−01 | 6.1222E−02 |
| S7 | −2.3060E−01 | 9.8543E−02 | −7.1579E−02 | 3.3327E−01 | −8.2682E−01 | 8.4259E−01 | −3.7416E−01 | 5.6234E−02 | 2.0729E−03 |
| S8 | −1.7305E−01 | 4.8929E−02 | −1.4729E−01 | 1.4514E−01 | −3.2423E−01 | 3.1426E−01 | −1.5860E−01 | 4.1767E−02 | −4.5935E−03 |
| S9 | −1.9063E−02 | −6.9338E−02 | 4.9969E−02 | −6.8252E−03 | −1.0110E−02 | 3.0170E−03 | 1.3110E−03 | −6.5156E−04 | 7.0989E−05 |
| S10 | −9.3099E−02 | 1.1356E−01 | −1.5358E−01 | 1.2798E−01 | −5.8007E−02 | 1.5042E−02 | −2.2508E−03 | 1.8149E−04 | −6.1370E−06 |
| S11 | −1.2528E−01 | 3.6091E−02 | −1.0099E−02 | 1.6027E−02 | −9.3050E−03 | 2.5756E−03 | −3.8560E−04 | 3.0398E−05 | −9.9627E−07 |
| S12 | −9.9583E−02 | 5.6747E−02 | −2.7487E−02 | 1.0241E−02 | −2.8039E−03 | 5.2968E−04 | −6.4879E−05 | 4.6187E−06 | −1.4380E−07 |

TABLE 15

| | f1 (mm) | f2 (mm) | f3 (mm) | f4 (mm) | f5 (mm) | f6 (mm) | f (mm) | TTL (mm) | ImgH (mm) |
|---|---|---|---|---|---|---|---|---|---|
| | | | | | parameter | | | | |
| numerical value | 3.27 | −6.72 | 37.02 | −67.26 | 2.60 | −2.02 | 3.99 | 4.95 | 3.38 |

Figures 10C, 10D:
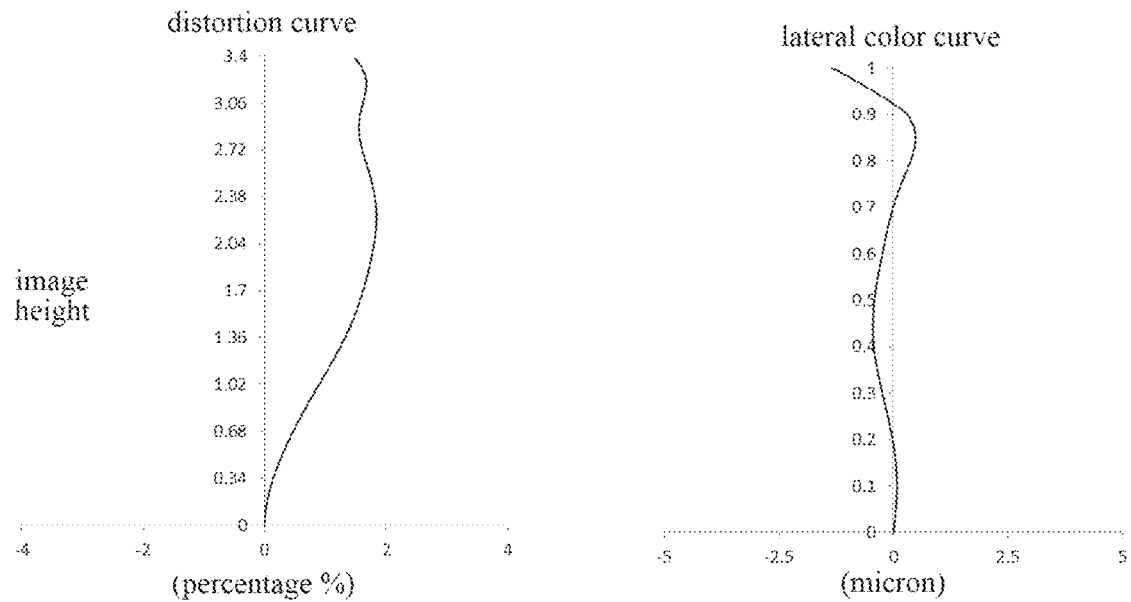

FIG. 10A illustrates the longitudinal aberration curve of the optical imaging lens assembly according to Embodiment 5, representing deviations of focal points of light of different wavelengths converged after passing through the lens assembly. FIG. 10B illustrates the astigmatic curve of the optical imaging lens assembly according to Embodiment 5, representing a curvature of the tangential image plane and a curvature of the sagittal image plane. FIG. 10C illustrates the distortion curve of the optical imaging lens assembly according to Embodiment 5, representing amounts of distortion at different viewing angles. FIG. 10D illustrates the lateral color curve of the optical imaging lens assembly according to Embodiment 5, representing deviations of different image heights on the image plane after light passes through the lens assembly. It can be seen from FIGS. 10A-10D that the optical imaging lens assembly according to Embodiment 5 can achieve a good imaging quality.

Embodiment 6

Figure 11:
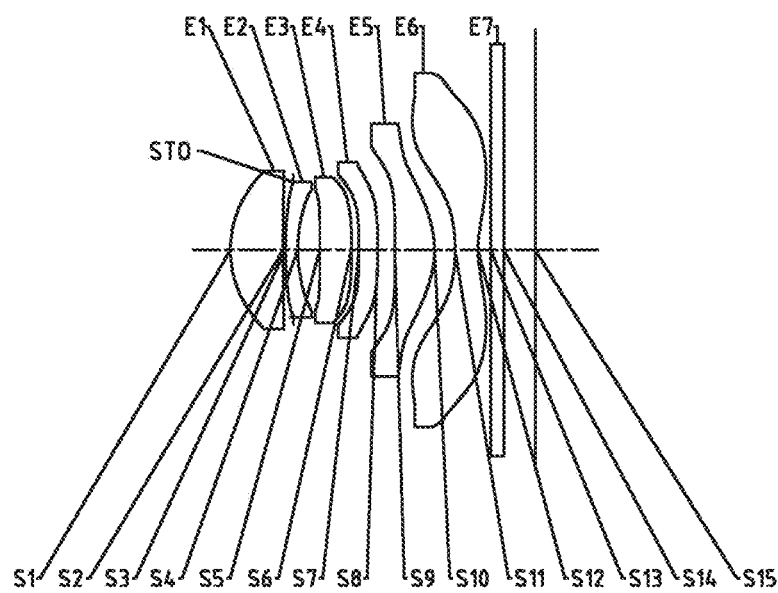
FIG. 11 is a schematic structural diagram illustrating an optical imaging lens assembly according to Embodiment 6 of the present disclosure.

An optical imaging lens assembly according to Embodiment 6 of the present disclosure is described below with reference to FIGS. 11-12D. FIG. 11 is a schematic structural diagram illustrating the optical imaging lens assembly according to Embodiment 6 of the present disclosure.

As shown in FIG. 11, the optical imaging lens assembly includes, sequentially from an object side to an image side along an optical axis, a first lens E1, a second lens E2, a third lens E3, a fourth lens E4, a fifth lens E5, a sixth lens E6, and an image plane S15.

The first lens E1 has a positive refractive power, an object-side surface S1 of the first lens E1 is a convex surface, and an image-side surface S2 of the first lens E1 is a concave surface. The object-side surface S1 and the image-side surface S2 of the first lens E1 are both aspheric surfaces.

The second lens E2 has a negative refractive power, an object-side surface S3 of the second lens E2 is a convex surface, and an image-side surface S4 of the second lens E2 is a concave surface. The object-side surface S3 and the image-side surface S4 of the second lens E2 are both aspheric surfaces.

The third lens E3 has a positive refractive power, an object-side surface S5 of the third lens E3 is a convex surface, and an image-side surface S6 of the third lens E3 is a convex surface. The object-side surface S5 and the image-side surface S6 of the third lens E3 are both aspheric surfaces.

The fourth lens E4 has a negative refractive power, an object-side surface S7 of the fourth lens E4 is a concave surface, and an image-side surface S8 of the fourth lens E4 is a convex surface. The object-side surface S7 and the image-side surface S8 of the fourth lens E4 are both aspheric surfaces.

The fifth lens E5 has a positive refractive power, an object-side surface S9 of the fifth lens E5 is a convex surface, and an image-side surface S10 of the fifth lens E5 is a convex surface. The object-side surface S9 and the image-side surface S10 of the fifth lens E5 are both aspheric surfaces.

The sixth lens E6 has a negative refractive power, an object-side surface S1 of the sixth lens E6 is a concave surface, and an image-side surface S12 of the sixth lens E6 is a concave surface. The object-side surface S11 and the image-side surface S12 of the sixth lens E6 are both aspheric surfaces.

Alternatively, the optical imaging lens assembly may further include an optical filter E7 having an object-side surface S13 and an image-side surface S14. Light from an object sequentially passes through the surfaces S1-S14 and finally forms an image on the image plane S15.

Alternatively, a diaphragm STO may be disposed between the first lens E1 and the second lens E2, to further improve the imaging quality of the lens assembly.

Table 16 shows the surface type, the radius of curvature, the thickness, the material and the conic coefficient of each lens of the optical imaging lens assembly in Embodiment 6. The radius of curvature and the thickness are both in millimeters (mm). Table 17 shows the high-order coefficients applicable to each aspheric surface in Embodiment 6. The surface type of each aspheric surface may be defined by the formula (1) given in Embodiment 1. Table 18 shows the effective focal lengths f1-f6 of the lenses in Embodiment 6, the total effective focal length f of the optical imaging lens assembly, the total track length TTL of the optical imaging lens assembly, and the half of the diagonal length ImgH of the effective pixel area on the image plane S15 of the optical imaging lens assembly.

TABLE 16

| surface number | surface type | radius of curvature | thickness | refractive index | abbe number | conic coefficient |
|---|---|---|---|---|---|---|
| | | | | material | | |
| OBJ | spherical | infinite | infinite | | | |
| S1 | aspheric | 1.7072 | 0.8521 | 1.55 | 56.1 | −0.0013 |
| S2 | aspheric | 32.6589 | 0.1540 | | | −92.4184 |
| STO | spherical | infinite | −0.1148 | | | 0.0000 |
| S3 | aspheric | 4.2892 | 0.2000 | 1.67 | 20.4 | −0.9519 |
| S4 | aspheric | 2.1492 | 0.3628 | | | −0.2346 |

TABLE 16-continued

| surface number | surface type | radius of curvature | thickness | material refractive index | abbe number | conic coefficient |
|---|---|---|---|---|---|---|
| S5 | aspheric | 38.3954 | 0.5072 | 1.55 | 56.1 | −99.0000 |
| S6 | aspheric | −48.6084 | 0.1275 | | | −65.7751 |
| S7 | aspheric | −57.9518 | 0.3000 | 1.67 | 20.4 | −66.5160 |
| S8 | aspheric | −200.0059 | 0.2771 | | | −99.0000 |
| S9 | aspheric | 56.5466 | 0.6471 | 1.55 | 56.1 | 97.5088 |
| S10 | aspheric | −1.4709 | 0.3339 | | | −7.6476 |
| S11 | aspheric | −3.1476 | 0.3705 | 1.54 | 55.7 | −2.3858 |
| S12 | aspheric | 1.7223 | 0.2080 | | | −11.3089 |
| S13 | spherical | infinite | 0.2100 | 1.52 | 64.2 | |
| S14 | spherical | infinite | 0.5145 | | | |
| S15 | spherical | infinite | | | | |

TABLE 17

| surface number | A4 | A6 | A8 | A10 | A12 | A14 | A16 | A18 | A20 |
|---|---|---|---|---|---|---|---|---|---|
| S1 | −6.8281E−03 | 3.6876E−02 | −1.0835E−01 | 2.0766E−01 | −2.7063E−01 | 2.3469E−01 | −1.2954E−01 | 4.0847E−02 | −5.6230E−03 |
| S2 | −9.3182E−02 | 4.5481E−01 | −1.1757E+00 | 2.0690E+00 | −2.5594E+00 | 2.1774E+00 | −1.2085E+00 | 3.9224E−01 | −5.6326E−02 |
| S3 | −1.8854E−01 | 6.3093E−01 | −1.3921E+00 | 2.1696E+00 | −2.2841E+00 | 1.5713E+00 | −6.5704E−01 | 1.4565E−01 | −1.2118E−02 |
| S4 | −1.0917E−01 | 1.8442E−01 | 2.8453E−01 | −2.5844E+00 | 7.6362E+00 | −1.2507E+01 | 1.2004E+01 | −6.3134E+00 | 1.4110E+00 |
| S5 | −6.7554E−02 | −1.2717E−02 | 9.4002E−02 | −7.1702E−01 | 2.3115E+00 | −4.3263E+00 | 4.6922E+00 | −2.7405E+00 | 6.6704E−01 |
| S6 | −1.3891E−01 | −2.6550E−02 | 3.0919E−01 | −9.1860E−01 | 1.4561E+00 | −1.5507E+00 | 1.0870E+00 | −4.3415E−01 | 7.2580E−02 |
| S7 | −2.2905E−01 | 1.1315E−01 | −1.5911E−01 | 5.2835E−01 | −1.0516E+00 | 9.8080E−01 | −4.1142E−01 | 5.4647E−02 | 4.2529E−03 |
| S8 | −1.7228E−01 | 5.9087E−02 | −5.9262E−02 | 2.3223E−01 | −4.2258E−01 | 3.8456E−01 | −1.9035E−01 | 4.9998E−02 | −5.5162E−03 |
| S9 | −1.8275E−01 | −7.4312E−02 | 6.3354E−02 | −2.9358E−02 | 1.1803E−02 | −9.3703E−03 | 5.3327E−03 | −1.3474E−03 | 1.2076E−04 |
| S10 | −9.2252E−02 | 1.1344E−01 | −1.5259E−01 | 1.2508E−01 | −5.5374E−02 | 1.3872E−02 | −1.9686E−03 | 1.4577E−04 | −4.2683E−06 |
| S11 | −1.2532E−01 | 3.5202E−02 | −7.7502E−03 | 1.3899E−02 | −8.3140E−03 | 2.3103E−03 | −3.4416E−04 | 2.6879E−05 | −8.7032E−07 |
| S12 | −9.7087E−02 | 5.3126E−02 | −2.4378E−02 | 8.6328E−03 | −2.2740E−03 | 4.1795E−04 | −5.0335E−05 | 3.5586E−06 | −1.1084E−07 |

TABLE 18

| | f1 (mm) | f2 (mm) | f3 (mm) | f4 (mm) | f5 (mm) | f6 (mm) | f (mm) | TTL (mm) | ImgH (mm) |
|---|---|---|---|---|---|---|---|---|---|
| numerical value | 3.27 | −6.72 | 39.37 | −122.67 | 2.64 | −2.02 | 3.99 | 4.95 | 3.40 |

Figure 12A:
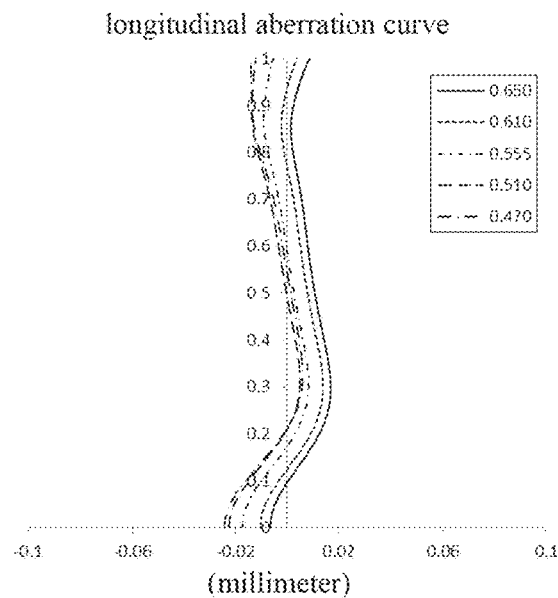
FIGS. 12A-12D respectively illustrate a longitudinal aberration curve, an astigmatic curve, a distortion curve, and a lateral color curve of the optical imaging lens assembly according to Embodiment 6.
Figure 12B:
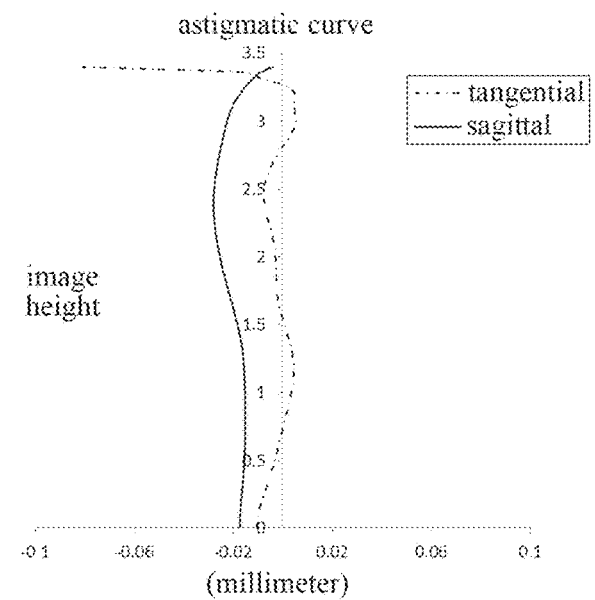
Figure 12C:
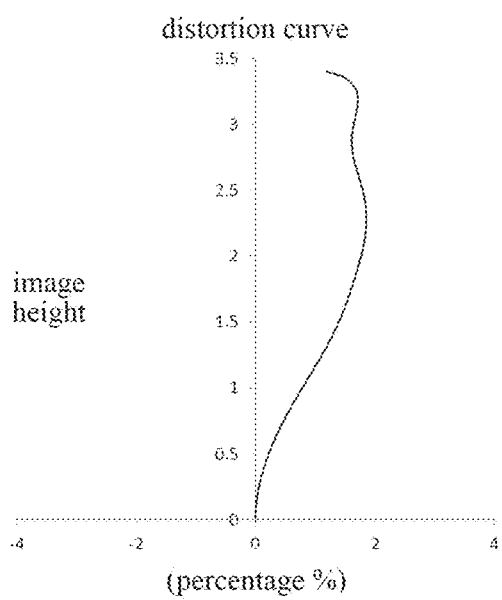
Figure 12D:
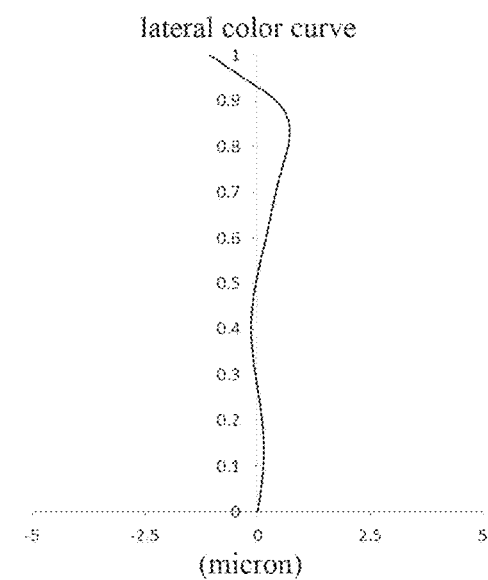

FIG. 12A illustrates the longitudinal aberration curve of the optical imaging lens assembly according to Embodiment 6, representing deviations of focal points of light of different wavelengths converged after passing through the lens assembly. FIG. 12B illustrates the astigmatic curve of the optical imaging lens assembly according to Embodiment 6, representing a curvature of the tangential image plane and a curvature of the sagittal image plane. FIG. 12C illustrates the distortion curve of the optical imaging lens assembly according to Embodiment 6, representing amounts of distortion at different viewing angles. FIG. 12D illustrates the lateral color curve of the optical imaging lens assembly according to Embodiment 6, representing deviations of different image heights on the image plane after light passes through the lens assembly. It can be seen from FIGS. 12A-12D that the optical imaging lens assembly according to Embodiment 6 can achieve a good imaging quality.

Embodiment 7

An optical imaging lens assembly according to Embodiment 7 of the present disclosure is described below with reference to FIGS. 13-14D. FIG. 13 is a schematic structural diagram illustrating the optical imaging lens assembly according to Embodiment 7 of the present disclosure.

As shown in FIG. 13, the optical imaging lens assembly includes, sequentially from an object side to an image side along an optical axis, a first lens E1, a second lens E2, a third lens E3, a fourth lens E4, a fifth lens E5, a sixth lens E6, and an image plane S15.

The first lens E1 has a positive refractive power, an object-side surface S1 of the first lens E1 is a convex surface, and an image-side surface S2 of the first lens E1 is a concave surface. The object-side surface S1 and the image-side surface S2 of the first lens E1 are both aspheric surfaces.

The second lens E2 has a negative refractive power, an object-side surface S3 of the second lens E2 is a convex surface, and an image-side surface S4 of the second lens E2 is a concave surface. The object-side surface S3 and the image-side surface S4 of the second lens E2 are both aspheric surfaces.

The third lens E3 has a positive refractive power, an object-side surface S5 of the third lens E3 is a convex surface, and an image-side surface S6 of the third lens E3 is a convex surface. The object-side surface S5 and the image-side surface S6 of the third lens E3 are both aspheric surfaces.

The fourth lens E4 has a positive refractive power, an object-side surface S7 of the fourth lens E4 is a convex surface, and an image-side surface S8 of the fourth lens E4 is a concave surface. The object-side surface S7 and the image-side surface S8 of the fourth lens E4 are both aspheric surfaces.

The fifth lens E5 has a positive refractive power, an object-side surface S9 of the fifth lens E5 is a concave surface, and an image-side surface S10 of the fifth lens E5 is a convex surface. The object-side surface S9 and the image-side surface S10 of the fifth lens E5 are both aspheric surfaces.

The sixth lens E6 has a negative refractive power, an object-side surface S11 of the sixth lens E6 is a concave surface, and an image-side surface S12 of the sixth lens E6 is a concave surface. The object-side surface S11 and the image-side surface S12 of the sixth lens E6 are both aspheric surfaces.

Alternatively, the optical imaging lens assembly may further include an optical filter E7 having an object-side surface S13 and an image-side surface S14. Light from an object sequentially passes through the surfaces S1-S14 and finally forms an image on the image plane S15.

Alternatively, a diaphragm STO may be disposed between the first lens E1 and the second lens E2, to further improve the imaging quality of the lens assembly.

Table 19 shows the surface type, the radius of curvature, the thickness, the material and the conic coefficient of each lens of the optical imaging lens assembly in Embodiment 7. The radius of curvature and the thickness are both in millimeters (mm). Table 20 shows the high-order coefficients applicable to each aspheric surface in Embodiment 7. The surface type of each aspheric surface may be defined by the formula (1) given in Embodiment 1. Table 21 shows the effective focal lengths f1-f6 of the lenses in Embodiment 7, the total effective focal length f of the optical imaging lens assembly, the total track length TTL of the optical imaging lens assembly, and the half of the diagonal length ImgH of the effective pixel area on the image plane S15 of the optical imaging lens assembly.

TABLE 19

| surface number | surface type | radius of curvature | thickness | material refractive index | material abbe number | conic coefficient |
|---|---|---|---|---|---|---|
| OBJ | spherical | infinite | infinite | | | |
| S1 | aspheric | 1.7024 | 0.8413 | 1.55 | 56.1 | −0.0025 |
| S2 | aspheric | 28.1618 | 0.1523 | | | −99.0000 |
| STO | spherical | infinite | −0.1070 | | | 0.0000 |
| S3 | aspheric | 4.2597 | 0.2000 | 1.67 | 20.4 | −1.1288 |
| S4 | aspheric | 2.1437 | 0.3659 | | | −0.2312 |
| S5 | aspheric | 28.3378 | 0.4960 | 1.55 | 56.1 | −99.0000 |
| S6 | aspheric | −479.3152 | 0.1341 | | | 99.0000 |
| S7 | aspheric | 35.6910 | 0.3023 | 1.67 | 20.4 | −99.0000 |
| S8 | aspheric | 39.2820 | 0.2794 | | | −99.0000 |
| S9 | aspheric | −200.0000 | 0.6540 | 1.55 | 56.1 | −99.0000 |
| S10 | aspheric | −1.4198 | 0.3296 | | | −7.1043 |
| S11 | aspheric | −3.0777 | 0.3704 | 1.54 | 55.7 | −2.4548 |
| S12 | aspheric | 1.7034 | 0.2077 | | | −11.2068 |
| S13 | spherical | infinite | 0.2100 | 1.52 | 64.2 | |
| S14 | spherical | infinite | 0.5142 | | | |
| S15 | spherical | infinite | | | | |

TABLE 20

| surface number | A4 | A6 | A8 | A10 | A12 | A14 | A16 | A18 | A20 |
|---|---|---|---|---|---|---|---|---|---|
| S1 | −8.2163E−03 | 4.7778E−02 | −1.5359E−01 | 3.1270E−01 | −4.1804E−01 | 3.6276E−01 | −1.9706E−01 | 6.0683E−02 | −8.1171E−03 |
| S2 | −8.2891E−02 | 3.8899E−01 | −9.8901E−01 | 1.7470E+00 | −2.1956E+00 | 1.9076E+00 | −1.0824E+00 | 3.5878E−01 | −5.2551E−02 |
| S3 | −1.7995E−01 | 5.8990E−01 | −1.3580E+00 | 2.3768E+00 | −3.0203E+00 | 2.7006E+00 | −1.6002E+00 | 5.6347E−01 | −8.9270E−02 |
| S4 | −1.0856E−01 | 1.8610E−01 | 2.2088E−01 | −2.1842E+00 | 6.3788E+00 | −1.0219E+01 | 9.5642E+00 | −4.8971E+00 | 1.0655E+00 |
| S5 | −7.8082E−02 | 7.9847E−02 | −4.0847E−01 | 1.0240E+00 | −1.6081E+00 | 1.3510E+00 | −3.9842E−01 | −1.7467E−01 | 1.1195E−01 |
| S6 | −1.3982E−01 | −3.0139E−02 | 2.6502E−01 | −6.4907E−01 | 7.3669E−01 | −4.9018E−01 | 2.0741E−01 | −5.1297E−02 | 4.5966E−03 |
| S7 | −2.2309E−01 | 1.1855E−01 | −3.2774E−01 | 1.1586E−01 | −2.3043E+00 | 2.4827E+00 | −1.4824E+00 | 4.6915E−01 | −6.2488E−02 |
| S8 | −1.5787E−01 | 2.9574E−02 | −4.1876E−02 | 2.6687E−01 | −5.0897E−01 | 4.7292E−01 | −2.3936E−01 | 6.4224E−02 | −7.1981E−02 |
| S9 | −1.3250E−02 | −6.5640E−02 | 6.0150E−03 | 8.1440E−02 | −1.0213E−01 | 6.0359E−02 | −2.0214E−02 | 3.8287E−03 | −3.2400E−04 |
| S10 | −9.0615E−02 | 1.0629E−01 | −1.5028E−01 | 1.3025E−01 | −6.0855E−02 | 1.6296E−02 | −2.5448E−03 | 2.1866E−04 | −8.1571E−06 |
| S11 | −1.1954E−01 | 1.9865E−02 | 1.0517E−02 | 2.2858E−03 | −4.0042E−03 | 1.3397E−03 | −2.1288E−04 | 1.7036E−05 | −5.5513E−07 |
| S12 | −9.8764E−02 | 5.3664E−02 | −2.4681E−02 | 8.8794E−03 | −2.4112E−03 | 4.6130E−04 | −5.7971E−05 | 4.2578E−06 | −1.3656E−07 |

TABLE 21

| | f1 (mm) | f2 (mm) | f3 (mm) | f4 (mm) | f5 (mm) | f6 (mm) | f (mm) | TTL (mm) | ImgH (mm) |
|---|---|---|---|---|---|---|---|---|---|
| | | | | parameter | | | | | |
| numerical value | 3.28 | −6.74 | 49.03 | 567.37 | 2.62 | −1.99 | 3.99 | 4.95 | 3.40 |

Figure 14C:
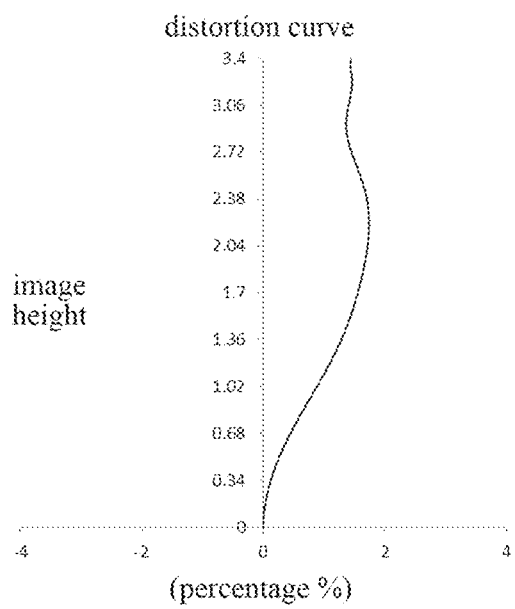
Figure 14D:
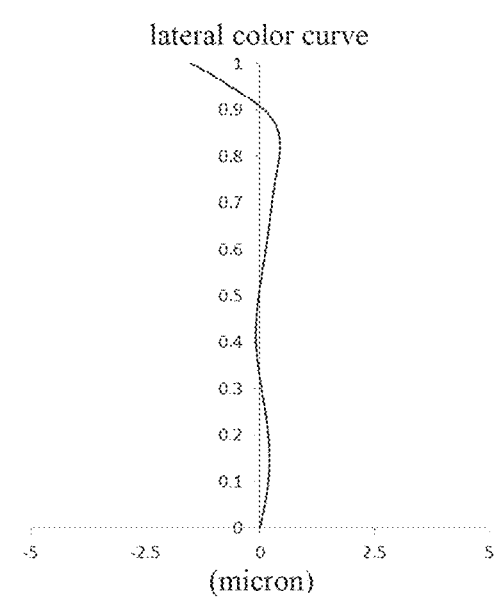

FIG. 14A illustrates the longitudinal aberration curve of the optical imaging lens assembly according to Embodiment 7, representing deviations of focal points of light of different wavelengths converged after passing through the lens assembly. FIG. 14B illustrates the astigmatic curve of the optical imaging lens assembly according to Embodiment 7, representing a curvature of the tangential image plane and a curvature of the sagittal image plane. FIG. 14C illustrates the distortion curve of the optical imaging lens assembly according to Embodiment 7, representing amounts of distortion at different viewing angles. FIG. 14D illustrates the lateral color curve of the optical imaging lens assembly according to Embodiment 7, representing deviations of different image heights on the image plane after light passes through the lens assembly. It can be seen from FIGS. 14A-14D that the optical imaging lens assembly according to Embodiment 7 can achieve a good imaging quality.

To sum up, Embodiments 1-7 respectively satisfy the relationships shown in Table 22 below.

TABLE 22

| Conditional Expression | Embodiment | | | | | | |
|---|---|---|---|---|---|---|---|
| | 1 | 2 | 3 | 4 | 5 | 6 | 7 |
| f/EPD | 1.58 | 1.57 | 1.58 | 1.58 | 1.57 | 1.58 | 1.59 |
| TTL/ImgH | 1.49 | 1.48 | 1.49 | 1.48 | 1.46 | 1.46 | 1.46 |
| CT2/T12 | 5.02 | 5.69 | 5.34 | 4.30 | 5.08 | 5.10 | 4.42 |
| f1/CT1 | 3.65 | 3.76 | 3.85 | 3.89 | 3.84 | 3.84 | 3.90 |
| (R7 − R8)/(R7 + R8) | 0.02 | 0.07 | 0.01 | 0.01 | 1.81 | −0.55 | −0.05 |
| f/R10 | −2.78 | −2.71 | −2.67 | −2.73 | −2.72 | −2.72 | −2.81 |
| R11/R12 | −1.73 | −1.78 | −1.83 | −1.85 | −1.80 | −1.83 | −1.81 |
| f5/f | 0.64 | 0.66 | 0.66 | 0.65 | 0.65 | 0.66 | 0.65 |
| ΣCT/TTL | 0.57 | 0.58 | 0.57 | 0.58 | 0.58 | 0.58 | 0.58 |
| f2/f | −1.44 | −1.49 | −1.67 | −1.68 | −1.69 | −1.68 | −1.69 |
| R3/R4 | 2.15 | 2.08 | 1.91 | 1.91 | 1.99 | 2.00 | 1.99 |

The present disclosure further provides an imaging device having a photosensitive element which may be a photosensitive charge-coupled device (CCD) or complementary metal-oxide semiconductor (CMOS) element. The imaging device may be an independent camera device such as a digital camera, or may be an imaging module integrated in a mobile electronic device such as a mobile phone. The imaging device is equipped with the optical imaging lens assembly described above.

The foregoing is only a description for the preferred embodiments of the present disclosure and the applied technical principles. It should be appreciated by those skilled in the art that the inventive scope of the present disclosure is not limited to the technical solution formed by the particular combinations of the above technical features. The inventive scope should also cover other technical solutions formed by any combinations of the above technical features or equivalent features thereof without departing from the concept of the invention, for example, technical solutions formed by replacing the features as disclosed in the present disclosure with (but not limited to) technical features with similar functions.

What is claimed is:

1. An optical imaging lens assembly comprising, sequentially from an object side to an image side along an optical axis, a first lens, a second lens, a third lens, a fourth lens, a fifth lens, and a sixth lens,
    wherein the first lens has a positive refractive power, and an object-side surface of the first lens is a convex surface;
    the second lens has a refractive power, an object-side surface of the second lens is a convex surface, and an image-side surface of the second lens is a concave surface;
    each of the third lens and the fourth lens has a refractive power;
    the fifth lens has a positive refractive power, and an image-side surface of the fifth lens is a convex surface;
    the sixth lens has a negative refractive power, and an object-side surface and an image-side surface of the sixth lens are concave surfaces; and
    a total effective focal length f of the optical imaging lens assembly and an entrance pupil diameter EPD of the optical imaging lens assembly satisfy: f/EPD≤1.6,
    wherein a center thickness CT2 of the second lens on the optical axis and a spacing distance T12 between the first lens and the second lens on the optical axis satisfy: 4.30≤CT2/T12≤5.69, and
    wherein an effective focal length f1 of the first lens and a center thickness CT1 of the first lens on the optical axis satisfy: 3<f1/CT1<4.

2. The optical imaging lens assembly according to claim 1, wherein an axial distance TTL from the object-side surface of the first lens to an image plane of the optical imaging lens assembly and half of a diagonal length ImgH of an effective pixel area on the image plane of the optical imaging lens assembly satisfy: TTL/ImgH≤1.5.

3. The optical imaging lens assembly according to claim 1, wherein an effective focal length f1 of the first lens and a center thickness CT1 of the first lens on the optical axis satisfy: 3.65≤f1/CT1≤3.90.

4. The optical imaging lens assembly according to claim 1, wherein a radius of curvature R3 of the object-side surface of the second lens and a radius of curvature R4 of the image-side surface of the second lens satisfy: 1.5<R3/R4<2.5.

5. The optical imaging lens assembly according to claim 1, wherein the second lens has a negative refractive power, and an effective focal length f2 of the second lens and the total effective focal length f of the optical imaging lens assembly satisfy: −2<f2/f<−1.

6. The optical imaging lens assembly according to claim 1, wherein a radius of curvature R7 of an object-side surface of the fourth lens and a radius of curvature R8 of an image-side surface of the fourth lens satisfy: −1<(R7−R8)/(R7+R8)<2.

7. The optical imaging lens assembly according to claim 1, wherein the total effective focal length f of the optical imaging lens assembly and a radius of curvature R10 of the image-side surface of the fifth lens satisfy: —3<f/R10<−2.5.

8. The optical imaging lens assembly according to claim 1, wherein an effective focal length f5 of the fifth lens and the total effective focal length f of the optical imaging lens assembly satisfy: 0.5<f5/f<1.

9. The optical imaging lens assembly according to claim 1, wherein a radius of curvature R11 of the object-side surface of the sixth lens and a radius of curvature R12 of the image-side surface of the sixth lens satisfy: −2<R11/R12<−1.5.

10. The optical imaging lens assembly according to claim 1, wherein a sum ΣCT of center thicknesses of the first lens, the second lens, the third lens, the fourth lens, the fifth lens, and the sixth lens on the optical axis, and the axial distance TTL from the object-side surface of the first lens to the image plane of the optical imaging lens assembly satisfy: 0.5<ΣCT/TTL<0.7.

11. An optical imaging lens assembly comprising, sequentially from an object side to an image side along an optical axis, a first lens, a second lens, a third lens, a fourth lens, a fifth lens, and a sixth lens,
wherein each of the first lens and the fifth lens has a positive refractive power;
each of the second lens and the sixth lens has a negative refractive power;
at least one of the third lens or the fourth lens has a positive refractive power;
at least one of an object-side surface of the first lens or an image-side surface of the first lens is a convex surface;
an object-side surface and an image-side surface of the sixth lens are concave surfaces; and
an image-side surface of the fifth lens is a convex surface, and a total effective focal length f of the optical imaging lens assembly and a radius of curvature R10 of the image-side surface of the fifth lens satisfy: −3<f/R10<−2.5,
wherein a center thickness CT2 of the second lens on the optical axis and a spacing distance T12 between the first lens and the second lens on the optical axis satisfy: 4.30≤CT2/T12≤5.69, and
an effective focal length f1 of the first lens and a center thickness CT1 of the first lens on the optical axis satisfy: 3<f1/CT1<4.

12. The optical imaging lens assembly according to claim 11, wherein the object-side surface of the first lens is a convex surface.

13. The optical imaging lens assembly according to claim 11, wherein a radius of curvature R3 of an object-side surface of the second lens and a radius of curvature R4 of an image-side surface of the second lens satisfy: 1.5<R3/R4<2.5.

14. The optical imaging lens assembly according to claim 13, wherein the object-side surface of the second lens is a convex surface, and the image-side surface of the second lens is a concave surface.

15. The optical imaging lens assembly according to claim 11, wherein an effective focal length f2 of the second lens and the total effective focal length f of the optical imaging lens assembly satisfy: −2<f2/f<−1.

16. The optical imaging lens assembly according to claim 11, wherein a radius of curvature R7 of an object-side surface of the fourth lens and a radius of curvature R8 of an image-side surface of the fourth lens satisfy: −1<(R7−R8)/(R7+R8)<2.

17. The optical imaging lens assembly according to claim 11, wherein an effective focal length f5 of the fifth lens and the total effective focal length f of the optical imaging lens assembly satisfy: 0.5<f5/f<1.

18. The optical imaging lens assembly according to claim 11, wherein a radius of curvature R11 of the object-side surface of the sixth lens and a radius of curvature R12 of the image-side surface of the sixth lens satisfy: −2<R11/R12<−1.5.

19. The optical imaging lens assembly according to claim 11, wherein an effective focal length f1 of the first lens and a center thickness CT1 of the first lens on the optical axis satisfy: 3.65<f1/CT1<3.90.

* * * * *